United States Patent [19]
Ebner

[11] 3,820,075
[45] June 25, 1974

[54] DATA RECEIVER
[75] Inventor: Theran L. Ebner, Houston, Tex.
[73] Assignee: Houston Natural Gas Corporation, Houston, Tex.
[22] Filed: Jan. 31, 1973
[21] Appl. No.: 328,468

[52] U.S. Cl. .......................................... 340/172.5
[51] Int. Cl. ............................................ G06f 9/18
[58] Field of Search ........ 340/172.5, 151; 179/2 DP

[56] References Cited
UNITED STATES PATENTS
3,700,816  10/1972  Evans et al. ................. 179/2 DP

*Primary Examiner*—Raulfe B. Zache
*Attorney, Agent, or Firm*—Fulbright & Crooker

[57] ABSTRACT

A data receiver for polling, receiving and processing data from a plurality of measuring transducers through a communication system. The receiver being capable of receiving data in a plurality of different signaling modes, processing the received data, and storing the processed data. Means for synchronizing the various signal modes and parity checking the accuracy and validity of the received data. Processing circuitry for handling both serially oriented data and parallel data. An electrically interlocked data programmer and data receiving device, the first of which controls the polling of the transducers and properly identifies the data received in the receiving device.

11 Claims, 23 Drawing Figures

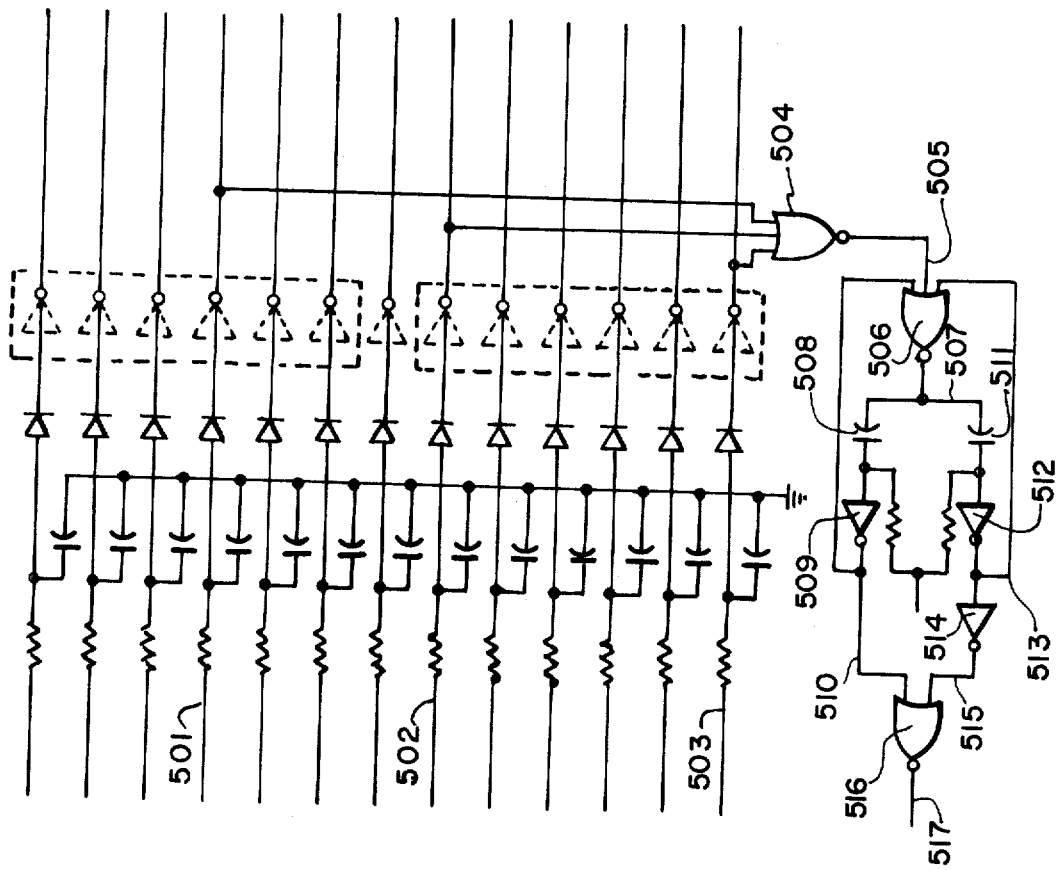

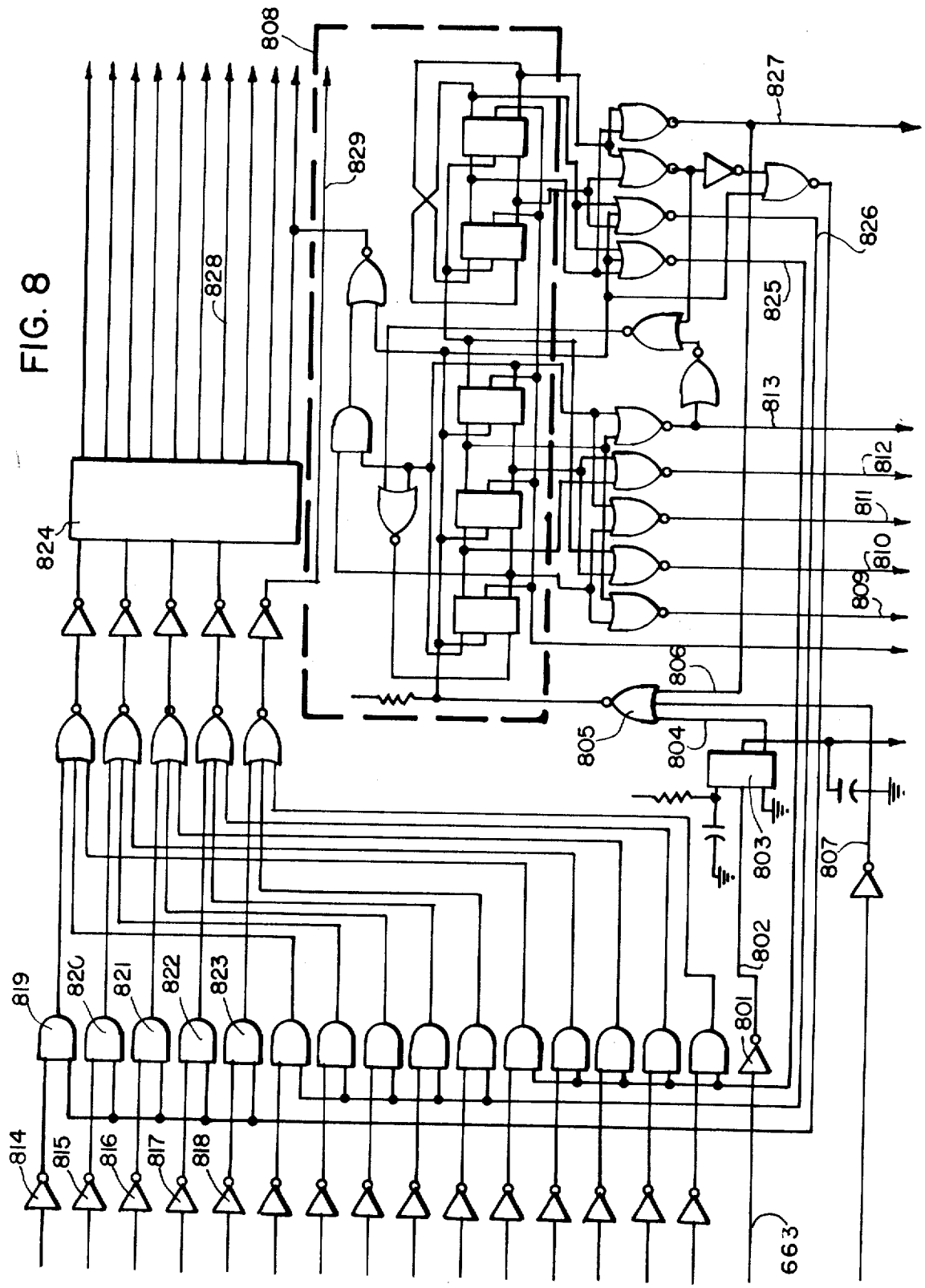

DATA RECEIVER

BACKGROUND OF THE INVENTION

Generally, data receivers for performing the function of automatically reading measuring transducers such as on electric, gas and water utility company meters have been proposed. However, such systems lack versatility in receiving measured data in a variety of different signaling modes and have lacked the capability of verifying the accuracy of the results received. The present invention is directed to various improvements in a data receiver, including one which is capable of receiving a plurality of different signaling modes, and which include various means for checking the validity and accuracy of the incoming data and rejecting data which does not meet the parity checks.

SUMMARY

The present invention is generally directed to a data receiver for polling, receiving and processing data from a plurality of measuring transducers through a communication system which has radio or telephone or even direct lines for receiving data from any desired transducers, for example only, transducers measuring electric, gas and water utility meters. The receiver is capable of receiving data in a plurality of signaling modes, determining which mode is being received, inhibiting action of circuits relating to modes which are not being received, electronically processing the received data and converting it to a suitable form in a data receiving device. The data receiver automatically polls the measuring transducers, determines through synchronizing and parity checks the accuracy and validity of the received data, and also verifies the accuracy of the transducers by use of circuitry described in U.S. Pat. No. 3,683,368, entitled Digital Encoding Transducer.

Incoming data is received along with synchronizing pulses, parity checks are made, and the data is stored in a temporary buffer memory circuit. Failure of the parity checks at any of a number of various points results in placing an error character in the data output, removal of the incorrect data from the memory, disconnection of the offending transducer and continuation of the polling process to another transducer. Receival of data which satisfies the accuracy of the parity checks is stored and transferred to a comparison circuit for checking for any ambiguity in the transducer reading. Upon final verification and validation, the information is stored in a data receiving device along with identification data from a data programmer and the data programmer initiates the process for polling the next transducers.

The data programmer and data output receiving device may, for convenience, be two keypunch machines used in a communication system having telephone subscriber lines for measuring electric, gas and water utility meters. The first keypunch machine functions as a card reader in which cards containing the customer's account information, previous data, and telephone number are inserted. The second machine functions essentially as a card punch. While the measuring transducers may be any suitable type, the type shown in U.S. Pat. No. 3,683,368 may be used having a five digit capacity but in which if a digit or encoder are not connected to the transducer produces a nil character thereby allowing the transducer to have the versatile capacity of encoding less than five digits. The nil quantity character serves the additional function of assuring that the lesser number of digits received was correctly positioned in the memory and therefore represents an additional parity check.

It is, therefore, one object of this invention to provide a data receiver for a communication system capable of operation in a plurality of different signaling modes.

It is a further object of the invention to provide a data receiver for a communication system which has the ability to identify the mode being received, inhibit circuitry associated with the modes not being received, and process the identified data.

Another object of this invention is to provide a data receiver for a communication system which has the ability to process 15 digits, each group of 5 representing data from a separate transducer such as an ordinary utility meter encoding device.

Another object of this invention is to provide a data receiver for a communication system which has the ability to reject all three of the data words or meter readings when any one of the three data words does not meet the multi-level parity checks.

Still another object of this invention is to provide a data receiver for a communication system having the ability to distinguish between a numeric 0, and nil quantity, that is, absence of a digit due to open circuits between the electronic sequencer and encoder or in the encoding mechanism, and absence of a digit because it is unavailable, that is, the capacity of the encoding device is less than the capacity of the data receiver.

A further object of this invention is to provide a data receiver for a communication system which has the ability to recognize at selected points in its operating sequence, that an unidentifiable condition exists which must be eliminated in the interest of proceeding with the system function after recording that fact that the condition did exist.

Another object of the present invention is to provide a data receiver for a communication system which is able to distinguish between data and synchronizing pulses contained in the data stream and remove them from the data word, storing only the data bits.

Another object of the present invention is to provide a data receiver for a communication system which operates at a speed and in other manners in complete compatability with a suitable communication system such as telephone equipment connecting it to the telephone switched network.

The data receiver delivers to the switched network through the telephone interfacing equipment those signals necessary for dialing a telephone number and other required purposes, and responds in decision making manner to signals from the switched network.

These and other objects of the present invention will be more fully understood after reading the following description of the accompanying drawings.

BRIEF DESCRIPTION OF THE DRAWINGS

FIG. 4A is a chart of the binary code for one type of transducer, FIG. 4B is a code for receiving parallel data of the transducer readings of the code of FIG. 4A, FIG. 5 is an electrical schematic of a portion of the interface for receiving a parallel signaling code, FIG. 8 is an electrical schematic of the data write circuit.

BRIEF DESCRIPTION OF THE PREFERRED EMBODIMENT

Figure 1:
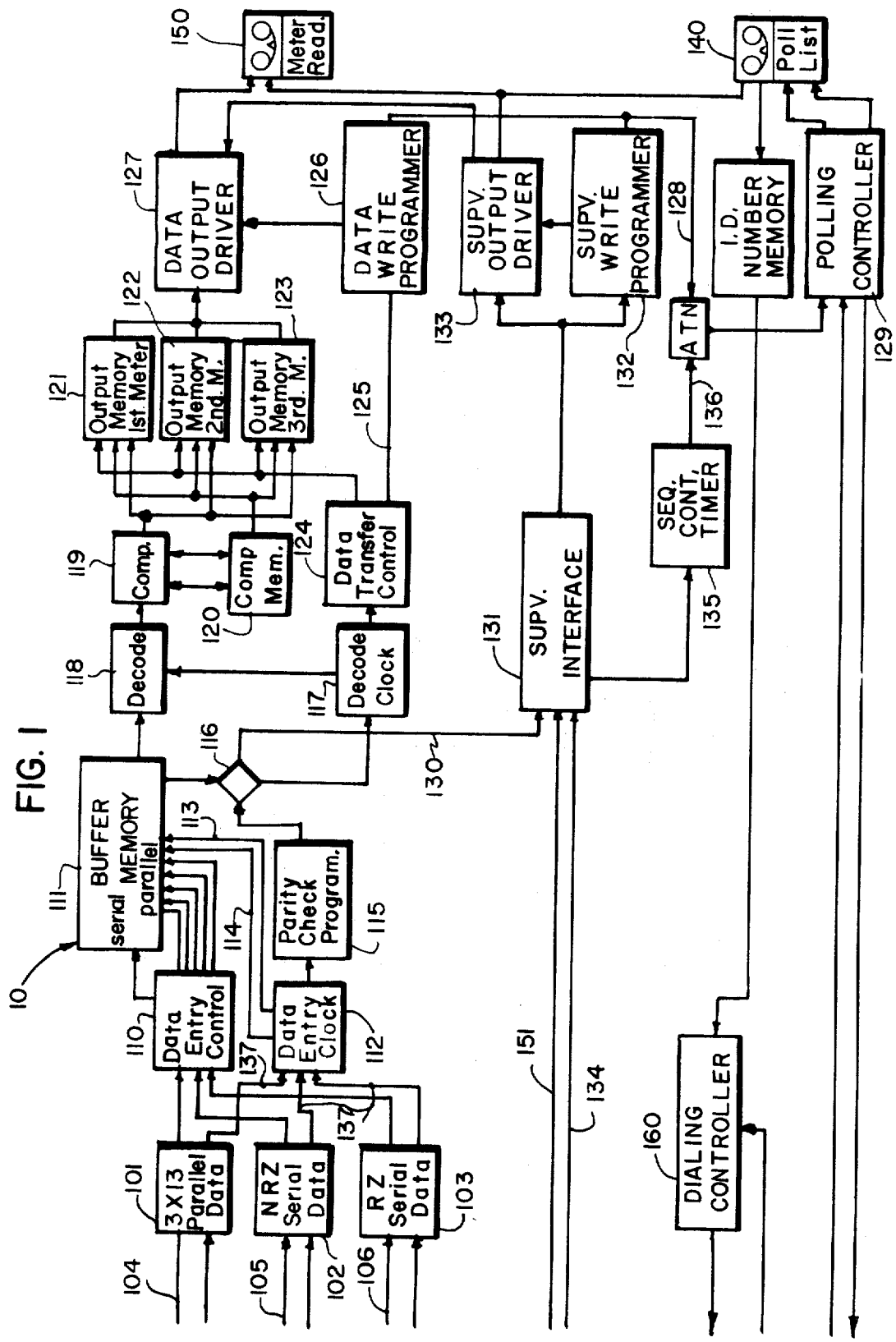
FIG. 1 is a block diagram illustrating the data receiver of the present invention in use with a telephone communication system.

Referring now to the drawings, particularly to FIG. 1, the data receiver of the present invention will be generally described, by way of example only, in connection with a telephone communication system; however, the present data receiver may be used with other types of communication systems, such as radio. The data receiver of the present invention may be connected to any suitable remote transducer encoder, such as the transducers disclosed in U.S. Pat. No. 3,683,368, for automatically reading, by way of example only, an electric, gas and water utility company meter, each encoder having a five digit capacity and capable of transmitting 32 coded characters such as by the codes noted in FIGS. 4A and 4B. Numerals 101, 102 and 103 represent circuits which are connected to and enabled by their respective carrier detectors 104, 105 and 106 which are in turn connected to separate transducers such as an electric, gas and water meter transducer. While the circuits 101, 102 and 103 could all be designed to receive a single type of signaling mode, the present data receiver 10 is capable of receiving a plurality of different signaling modes depending upon the type of connected equipment. By way of example only, circuit 101 is capable of receiving a parallel signaling mode in a format commonly referred to as 3 out of 13 which will be more fully described hereinafter. Circuit 102 may receive a serial type of signaling mode such as a non-return to zero (NRZ) type, and circuit 103 may receive a serial data type of signaling mode such as a return to zero (RZ) type. Circuits 101, 102 and 103 function to remove synchronizing pulses from their respective incoming data stream and pass the remaining data components through data entry control 110 to a buffer memory 111 such as a shift register. Synchronizing components 137 from the circuits 101, 102 and 103 are transmitted to and are used to control a data entry clock 112. Parity checks are made by parity check programmer 115 and parity check circuit 116.

Data entry clock 112 furnishes both a shift parallel-data signal 113 and enter serial data signal 114 to buffer memory 111 as required to properly enter the incoming data for temporary storage. Clock 112 also furnishes control signals to the parity check programmer 115. At certain points during the data entry sequence, parity check programmer 115 enables parity check 116 to ascertain whether data has been entered properly.

Favorable comparison of the data stored in the shift register or buffer memory 111 results in a further circuit action as follows: the lowest order data digit in the buffer memory is transferred in bit parallel form to comparator 119 and a comparator memory 120. The next higher order digit is transferred in like manner through a comparator circuit which is conditioned to allow passage of a properly accented number, as described in U.S. Pat. No. 3,683,368, by the comparator memory 120. Corrections are made to this number by the comparator so that the corrected number is entered into the output memory. The second higher order number is also stored in a separate cell of the comparator memory 120. The next higher order number is then transferred in similar manner to the output memory after comparison as previously described. The fourth higher order number is processed in the same manner. If a fifth higher order number is received it will also be transferred in the same manner. Normally, however, the fifth digit will not be transmitted from the remote transducer since it ordinarily is associated with a four digit number and therefore a nil quantity character should be received. This nil quantity character serves the additional function of assuring that the four digit number received was correctly positioned in the memory and therefore represents another parity check.

Parity check 116 enables decode clock 117 which is responsible for (1) conversion of the data in the buffer memory 111 from binary form to decimal form through decode 118, (2) comparison of the decimal number with the decimal number previously received by interaction between 119 and 120, (3) correction, if necessary, and application to output memory 121, 122 and 123 inputs for each of the three transducers such as electric, gas and water meter transducers.

Decode clock 117 also controls data transfer control 124 which, at the proper time in the sequence, enables the appropriate output memory 121, 122 or 123 so that data present on its input lines becomes stored.

The above described process is repeated three times so that all three output memories 121, 122 and 123 are filled with data. Next, data control 124 initiates the data write cycle by applying a signal 125 to data write programmer 126.

The data write programmer 126 actuates data output driver 127 causing data to be received by the data output receiving device 150. While devices 150 and data programmer 140 may be any suitable input/output equipment such as, for example, teletype, magtape, line printers, and are schematically shown as magtape machines, they will be presently described in use as ordinary keypunch machines. The first keypunch machine, data input programmer 140, functions as a card reader and cards in this machine contain customer account information, previously read data and transducer (customer) telephone number. The second keypunch machine or data output receiving device 150 is electrically interlocked to 140. Upon completion of the output signal, the next card in the programmer 140 is registered in the read position, a blank card is registered in the punch position in the data output device 150 and the information on the data programmer 140 is duplicated on the output card in the device 150. When the write cycle has been completed, that is when data from all three output memories 121, 122 and 123 has been written by the output driver 127, an output signal 128 is generated which erases all the data stored in the previously described circuitry and causes the polling controller 129 to continue the polling (interrogation) sequence to be described later.

If the data stored in the buffer memory 111 fails to meet the parity check criteria at any time during the data sequence, parity check 116 generates a parity error signal 130. The parity error signal initiates the supervisory write cycle through supervisory interface 131 and supervisory write programmer 132. Failure of the parity check results in punching of an error character in the output card, removal of the incorrect data from the shift register 111, disconnection from the offending transducer, continuation of the polling process to the next transducer to be interrogated, and replacement of the card in the two keypunch machines 140 and 150 by the next one in the sequence.

Supervisory output driver 133 causes a mnemonic signal for parity error (E) to be recorded by the output keypunch 150 in the present embodiment. Upon completion of the supervisory write cycle an advance signal 128 is originated by supervisory write programmer 132 and polling controller 129 continues the interrogation sequence.

A sequence status supervisory signal 134 precedes incoming data and, in effect, announces that data is to be expected. This signal through action of supervisory interface 131 is normally recorded by a write supervisory cycle as previously described and also starts sequence continuity timer 135. The timing period of sequence continuity timer 135 is adjusted to be slightly longer than a normal data cycle. In the event that incoming data is terminated before all three output memories are filled, or for some other reason a data write cycle is not initiated, sequence continuity time 135 initiates a signal 136 which causes controller 129 to continue the interrogation sequence. This prevents the system from remaining in an indeterminate condition.

Figure 2A:
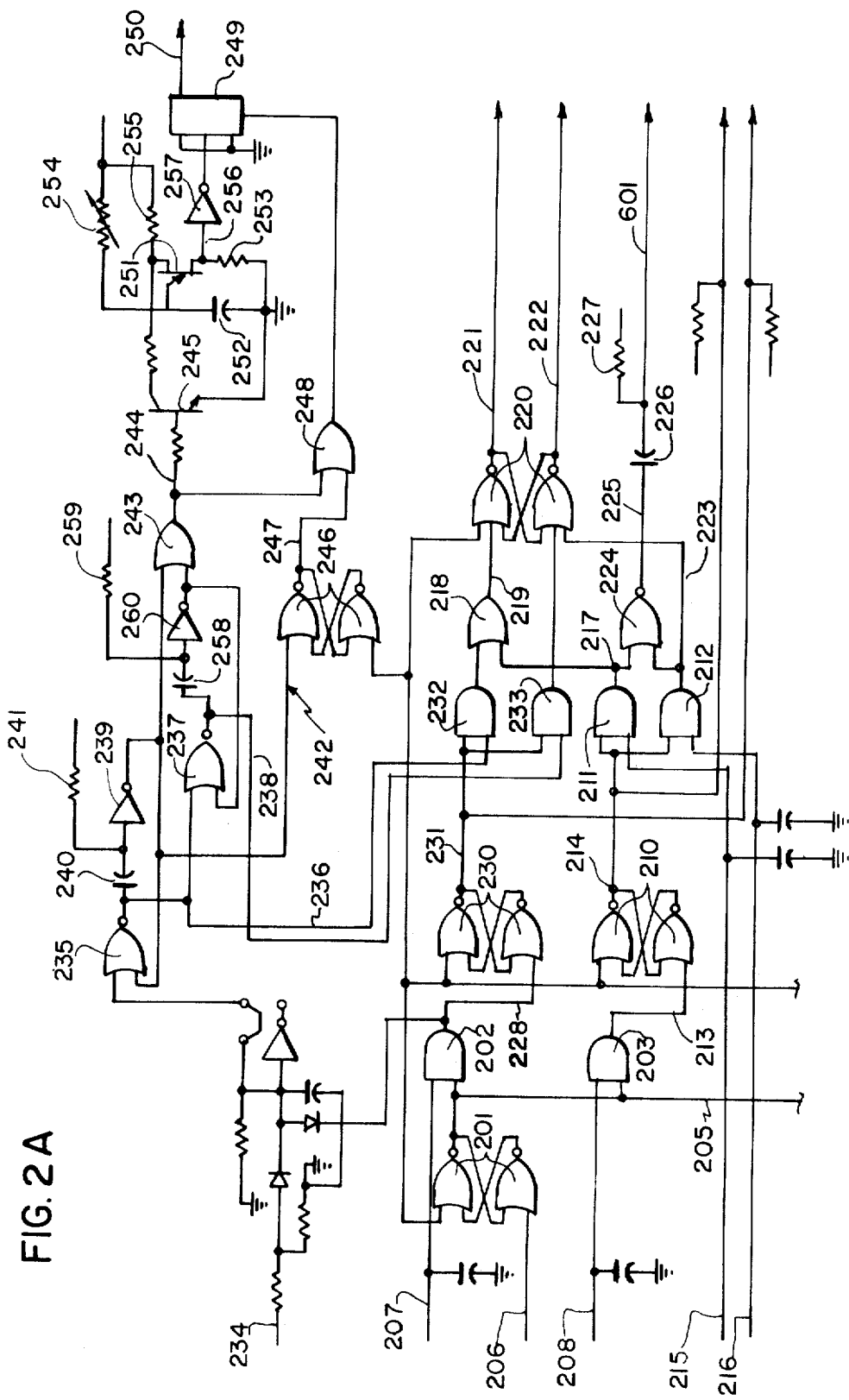
FIG. 2A is an electrical schematic of a portion of the input to the data receiver.
Figure 2B:
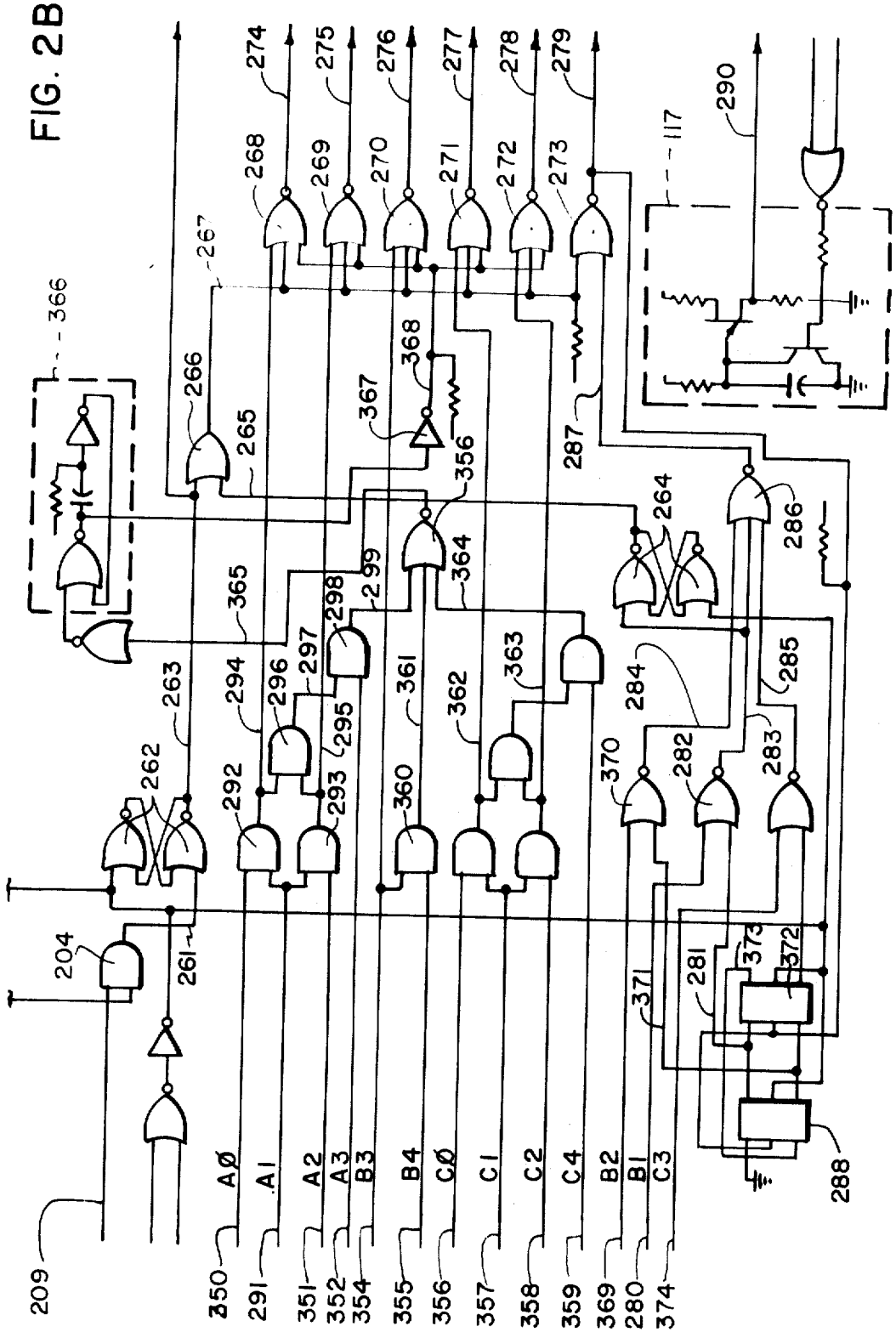
FIG. 2B is a continuation of FIG. 2A.

Refer now to FIGS. 2A and 2B, which shows a logical schematic diagram of the determination of the signal mode, data entry control 110, and data control entry clock circuit 112. Assume that the data receiver receives a return to zero type data received serially at circuit 103 (FIG. 1) through lines 215 and 216 in FIG. 2A.

Latch circuit 201 (FIG. 2A), in its quiescent state, inhibits response of AND gates 202, 203 and 204 (FIG. 2B) to any incoming signals by applying a logical low signal to their inputs 205. The inhibit signal is removed when a sequence status signal 206 is applied to latch circuit 201 causing the latch to switch so that 205 becomes a logical high. AND gates 202, 203 and 204 are then enabled and may respond to carrier detector signals 207, 208 or 209 at their input.

To illustrate the action of these circuits assume that AND gate 203 has been enabled by signal 205 and signal 208. 213 then assumes the logical high state and causes latch 210 to remove the inhibit (low) signal 214 from AND gates 211 and 212. Subsequent data pulses at 215 or 216 will cause AND gates 211 or 212 to respond as follows:

A data zero pulse, 215, will cause 211 to apply a logical high signal 217 to OR gate 218. Latch circuit 220 in its quiescent state holds 221 at a logical low and 222 in the logical high condition. Switching of OR gate 218 by the incoming data zero signal 215 causes 219 to assume the logical high state which has no effect on latch 220.

A data one bit, 216, causes AND circuit 212 to respond by switching its output 223 to the high logical state. Latch circuit 220, in this instance, is switched and 222 assumes the low logical state and 221 assumes the high logical state. Signals 221 and 222 are connected to buffer memory circuit 111 input flip flop 301 illustrated in FIG. 3.

Figure 3:
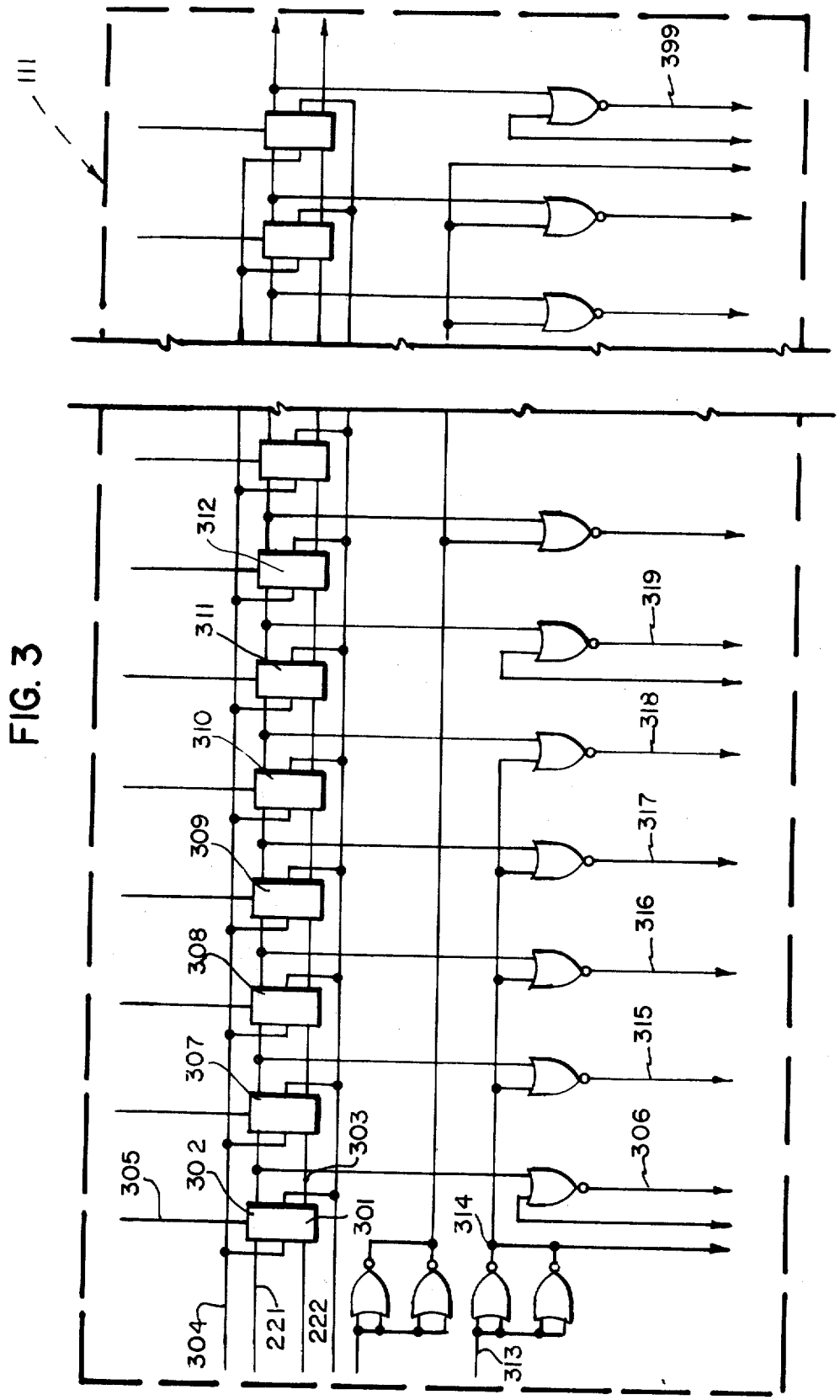
FIG. 3 is an electrical schematic of the buffer memory of the present invention.

Referring to FIG. 3, in its quiescent state 301 is in a condition such that 302 is at a logical low and 303 is at a logical high. It is a conventional J-K flip flop circuit and will respond as follows: A negative going pulse from clock 112 applied at 304 will cause 301 outputs, 302 and 303 to assume the same logical level as inputs 221 and 222 respectively. That is, if 221 is high and 222 is low and a clock pulse 304 is received 302 will become or remain high and 303 will become or remain low. In this condition 301 contains a data one bit having been received at 216 as previously described.

Clock pulse 304 is, in this mode, derived as follows:

During the time a data zero or data one bit 215, or 216 is present, either 217 or 223 is in a high logical state and NOR gate 224 output 225 is at a logical low. At the end of the data pulse, 225 assumes the high logical condition and charging current for capacitor 226 flowing through resistor 227 is inverted and amplified by 604 and 605, FIG. 6, and connected to 304. The data pulse stored in latch 220 and connected to 301 by 221 and 222 is therefore clocked into the memory 111 at flip flop 301 by pulse 304. The above description illustrates the manner in which the data receiver responds to return-to-zero type data received serially. No further action on the part of 304 or latch 220 can occur until another data bit is received.

Non-Return-to-Zero Signaling Mode

Another data format which the data receiver is designed to operate with is the non-return-to-zero (NRZ) type serial data consisting of only two states, that is, a binary one or binary zero state. Response of the receiver circuitry to this type of data is as follows:

Referring to FIG. 2A, AND gate 202, as previously described, is enabled by the action of latch 201 upon receipt by it of a sequence status signal 206. Carrier detector signal 207 causes AND gate 202 output 228 to switch latch 230 output 231 to the high logical state enabling AND gates 232 and 233. Incoming data signals at 234 are supplied to latch 220 through a different route than that previously described. Assume, for example, that 234 contains a binary one signal and is therefore in a logical high condition. NOR gate 235 inverts this signal to a logical low 236 which inhibits AND gate 232. NOR gate 237 output 238, however, becomes high and AND gate 233 causes latch 220 output 222 to assume the low logical state and output 221 to assume the high logical state. Flip flop 301 (FIG. 3) therefore has present at its input 221 and 222 a data one bit.

NOR gate 235 and inverter 239 together with capacitor 240 and resistor 241 comprise a conventional one-shot circuit which responds to the leading edge of a positive going pulse at line 234. The output of the circuit 242 is a positive going pulse approximately one millisecond long. OR gate 243 output 244 is normally in the low logical condition. Transistor 245 is therefore not conducting. Latch circuit 246 output 247 is normally high so that the output of OR circuit 248 is normally high. Flip flop circuit 249 is therefore held in its quiescent condition by this high signal and 250 is therefore low.

Transistor 251 is the active member of a conventional timing circuit comprised of capacitor 252 and resistors 253, 254 and 255. In the quiescent condition, that is prior to the reception of data, this timing circuit is free running, generating an output pulse 256 each 3.3 milliseconds which is inverted by inverter 257 and applied to the clock input of flip flop 249. Due to the presence of the clear signal from 248 on 249 the flip flop is unable to respond to these clock signals.

When data is first received signal 242 causes latch circuit 246 to be switched so that its output 247 becomes low. The output of OR circuit 248 is now dependent upon signal 244 which at this instant is high due to the influence of 242. Signal 244 high causes transistor 245 to conduct which in turn causes transistor 251 to conduct and start a new timing cycle. At the end of the timing cycle of 251 when its output pulse 256 occurs 249 is switched so that 250 goes to a high logical state. Signal 250 is inverted and amplified by inverters 605 and 605, (FIG. 6) and applied to 304 in FIG. 3 so that the data bit present in latch 220 is clocked into flip flop 301.

In this mode transistor 251 continues to operate and apply clock pulses to the data clock 112 with line 304 being restored to synchronism at the leading edge of every positive going data pulse by signal 244. Synchronizing pulses are also generated through the action of NOR gate 237, capacitor 258, and inverter 260 which comprise a conventional one-shot circuit which responds to the trailing edge of positive going data pulses and causes OR gate 243 output 244 to go positive for approximately a one millisecond interval. This pulses serves as a clock pulse during data one bits.

Parallel Signaling Mode

The third signaling mode which the data receiver is capable of operation in is a parallel mode where data is received in a format commonly referred to as 3 out of 13. Three groups of tones A, B or C are divided into several frequencies each. The A group may be referred to as A0, A1, A2 and A3. The B group we will refer to as B1, B2, B3 and B4 and the C group will be referred to as C0, C1, C2, C3 and C4. Ground rules for the matrix are: 1 and only 1 tone frequency may be transmitted from each group at any given time. A data character will always be represented by 1 tone from each of the 3 groups so that 3 tones are always required to transmit a given character. The 32 characters which our data receiver is capable of processing are shown in FIG. 4A. The relationship of the 3 by 13 matrix to the characters is shown in FIG. 4B. For example, to transmit the X character shown in FIG. 4A, FIG. 4B shows that A3, B4, C4 represent the character. Similarly, to transmit the character 0 shown in Table 4A, Table 4B shows that A1, B3, C0 is required, etc.

Referring now to FIG. 2B for purposes of illustration, we can assume that a signal 209 has enabled AND gate 204 and that its output signal 261 is high causing latch circuit 262 output 263 to be in the low logical state.

Prior to the reception of the first data pulse, latch circuit 264 output 265 is in a high logical condition and OR circuit 266 output 267 is high. NOR gates 268, 269, 270, 271, 272 and 273 are therefore inhibited from response to any input signals and their respective outputs 274, 275, 276, 277, 278, 279 are all in the logical low condition.

The first data pulse to be received in a parallel data word is always the B1 tone or signal 280. Signal 280, in the quiescent condition, is at a logical high. Signal 281, prior to the reception of signal 280 is at a logical low condition.

Upon receipt of signal 280 NOR gate 282 output 283 assumes the high logic level since both of its inputs are low, and latch circuit 264 output 265 assumes the low logic level condition. OR gate 266 output 267 therefore assumes the low logic condition, removing one of the inhibits from NOR gates 268, 269, 270, 271, 272 and 273. Signal 284 is at a low logic level, signal 285 is at a low logic level and signal 283 is at a high logic level due to the presence of signal 280 and therefore NOR gate 286 output 287 is at a low logic level. NOR gate 273 inputs signals 287 and 267 are both at the low logic level and therefore its output 279 is at the high logic level. Output 270 is connected to 305 in FIG. 3 which is the direct set input of flip flop 301. Signal 279 therefore causes flip flop 301 to switch to the one state, 302 assumes the high logic level and 303 assumes the low logic level. Signal 306 assumes the low logic level.

At the end of signal pulse 280 signal 279 returns to the low logic level, and flip flop 288 is switched from its quiescent condition to its binary 1 state. This causes signal 281 to assume the high logic level which inhibits NOR gate 282 from further response to signals 280.

Figure 6:
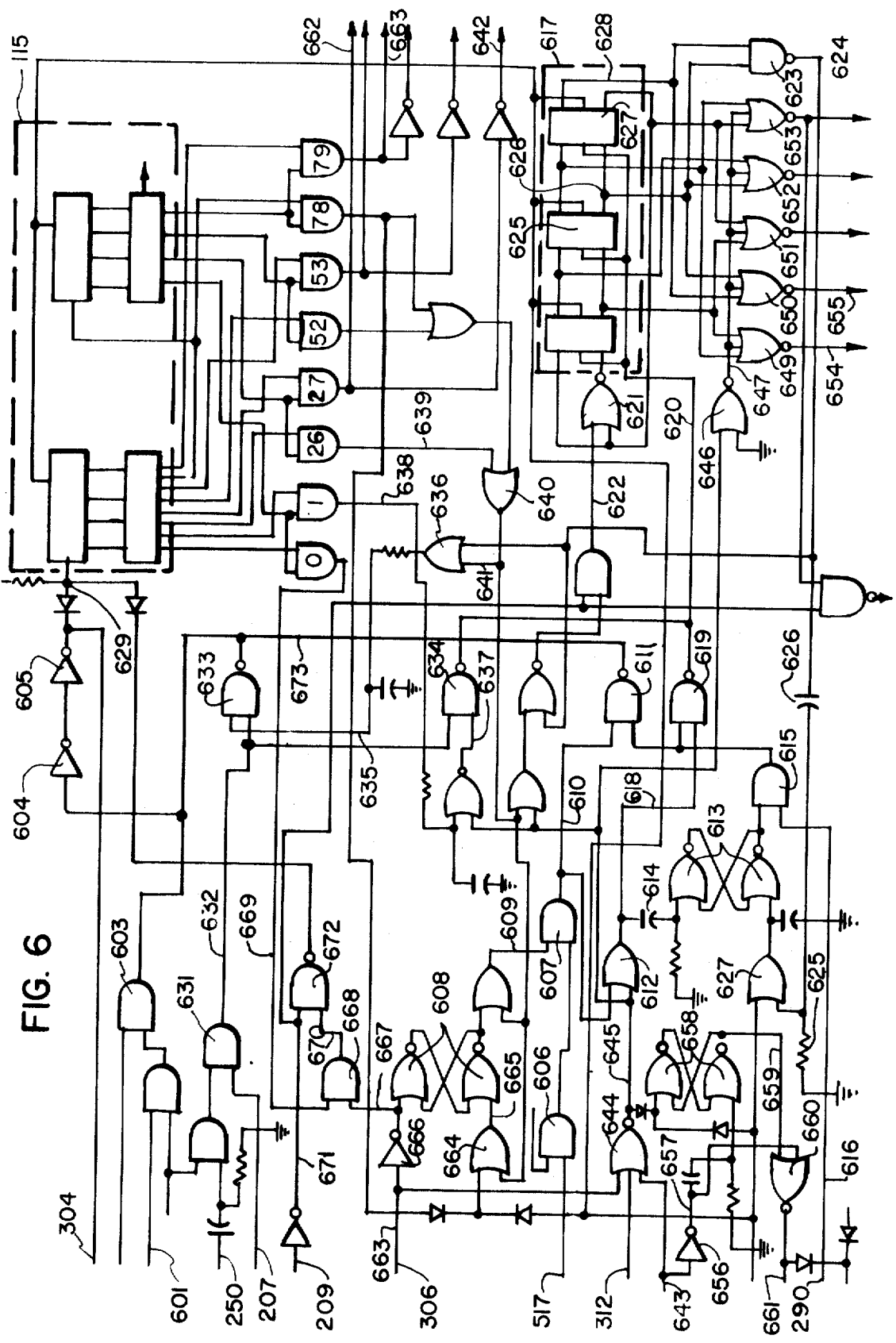
FIG. 6 is an electrical schematic showing the parity check programmer and associated circuits.

Signal 306 is connected to FIG. 6 at 663. When 306 assumes the low logic level, inverter 666 output 667 enables AND gate 668. The other input to 668 is also high since parity check programmer 115 is at zero and 669 is high.

Signal 670 is therefore high and since 671 was already high due to signal 209 low, a clock pulse 629 is produced by NAND gate 672.

The effect of signal 306 was to produce this clock pulse and cause programmer 115 to advance to a count of 1. Signal 638 assumes the high logic level at a count of 1.

The signaling format is so arranged that each data pulse received is followed by an intersymbol or rest pulse which always consists of tones A3, B4 and C4.

Referring to FIG. 5, it can be seen that coincidence of tone A3, signal 501, B4, signal 502 and C4, signal 503 (all in the logical low state) causes NOR circuit 504 output 505 to assume the high logical condition.

NOR gate 506 output 507 therefore assumes the low logic level condition. Capacitor 508, during its charging cycle, effectively grounds the input of inverter 509 so that its output 510 assumes the high logic level. Capacitor 511 also begins to charge and during its charging cycle effectively grounds the input of inverter 512. Signal 513 assumes the high logic level causing inverter 514 output 515 to assume the logic low condition. The output of NOR circuit 516, signal 517 is held to the low logic level for the two millisecond interval of signal 510 at which time it changes to the high logic level, remaining there for the period of time during which signal 517 remains low.

Signal 517 is connected to AND gate 606 in FIG. 6 which enables AND gate 607.

Signal 517 is a sample of signal 505 with the leading edge delayed 2 Ms by signal 510 and the sample length controlled by signal 515.

Signal 306 also causes latch circuit 608 to switch so that signal 609 is in the high logical state. Signal 610 therefore assumes the high logical state when signal 517 goes high and gate 607 is enabled. Signal 610 enables NAND gate 611. Signal 610 also causes OR gate 612 to deliver a pulse to latch circuit 613 through capacitor 614 which causes the latch circuit to switch and enable AND gate 615.

Returning briefly to FIG. 2, decode clock circuit 117 is a conventional free running unijunction clock circuit whose output 290 pulses are connected to FIG. 6 AND gate 615 at 616. These clock pulses are routed through AND gate 615, NAND gate 611, and inverters 604 and 605 to buffer memory FIG. 3 clock 304 and causes the one bit stored in flip flop 301 to be shifted into the memory through flip flops 307, 308, 309, 310 and 311 and stopping in flip flop 312. Note that the data bit has been shifted six positions. Signal 304 also drives parity programmer 115 at 629 so that six additional counts are added to the parity count. The counter is then at a count of 7. The shifting sequence is controlled by counter circuit 617 in FIG. 6. Operation of the counter circuit is as follows:

OR gate 612 output 618 assumed the high logic level condition at the time it switched latch circuit 613 and therefore enabled NAND gate 619. Clock pulses from AND gate 615 therefore are routed through NAND gate 619 to counter 617 at 620.

Counter 617 is a shift mode type counter designed to operate in one of two modes under the control of NOR gate 621. At the present time in the sequence, signal 622 is at the low logic level which allows the counter 617 to operate in a modulus of 6, that is, 6 clock pulses are required to move the counter from 0 through a complete cycle and return it to the 0 condition from which it started. On the sixth clock 117 pulse NAND gate 623 output 624 changes from the low logic level to a high. Charging current through resistor 625 for capacitor 626 causes OR gate 627 to switch latch circuit 613 back to its original state, inhibiting AND gate 615 and stopping clock pulses to buffer memory 111 and counter 617.

NAND gate 623 is connected to the counter in a manner such that its output 624 remains at the high logic level until the counter has received a total of 5 clock pulses 620. The fifth clock pulse switches flip flop 625 output 626 to the high logic condition so that both inputs to NAND gate 623 are high and its output 624 is low. The sixth clock pulse switches flip flop 627 output 628 to the low logic condition causing NAND gate 623 output 624 to return to the high logic state and reset latch 613 as previously described.

The foregoing discussion has illustrated the manner in which the first data bit received by the receiver in each of three modes is handled. In review, serial data was first presented to the buffer memory circuit 111 in FIG. 2 at 221 and 222. In the return-to-zero mode the data bit was actually clocked into buffer memory storage 301 at the end of the incoming data bit. In the non-return-to-zero serial mode the data bit was clocked into storage at 301 by a clock signal at 304 in the approximate center of the incoming data bit. In the last described, parallel mode, the data was entered into 301 through parallel entry at 305 and moved to the right to position 312 by six clock pulses applied to 304 during an intersymbol pulse which occurs after receipt of each data bit. This novel technique allows the use of a serially oriented buffer memory for handling of parallel data.

Note that clock pulses applied to 304 are also applied simultaneously to 629 through NAND gate 611 and inverters 604 and 605 so that parity counter 115 keeps count of the number of clock pulses applied to the buffer memory. Processing of data from all three of the modes is so arranged that when the parity programmer 115 has reached a count of 27, the data entry sequence is completed and certain checks are performed before further processing occurs. In addition to this function, parity programmer 115 performs certain other functions relative to each specific signaling mode which will now be described.

Return-to-Zero Serial Mode

In the return-to-zero type signaling mode a clock pulse is generated, as previously described at the end of each data bit pulse when the signaling carrier returns to the "zero" tone. That is, one tone frequency is used to transmit data binary one bits, another tone frequency is used to transmit data binary zero bits, and a third tone frequency is used as a timing base and bit separator. This tone is transmitted after each data bit whether it is a data one or a data zero so that data bits are always of unit length. The role of the parity programmer 115 in this mode then, is to simply count the number of clock pulses applied to the buffer memory circuitry 304 until it reaches a count of 27 including the five digit transducer reading of five bits each where it initiates transfer and other data processing sequences to be described later.

Non-Return-to-Zero Serial Mode

In this signaling mode, parity programmer 115 and counter 617 work together in a novel manner to anticipate synchronizing pulses contained in the data word, and inhibit clock pulses to the data memory during each of the synchronizing pulses thus preventing their entry into the buffer memory 111.

The signaling format in this mode is such that in each data word the 7th, 13th, 19th and 25th bit periods are synchronizing pulses. The incoming data word is 31 bit periods in length. By eliminating the synchronizing pulses the data word is permuted to a length of 27 bit periods. The synchronizing pulses are always complementary to the immediately preceding data bit, that is, the sync pulse at a count of seven is complementary to the 6th data bit pulse, etc. so that the leading edge of the synchronizing pulses are always present. The trailing edge of the synchronizing pulse may or may not be present since the next following data bit may be of the same character as the synchronizing pulse.

Processing of the synchronizing pulses is achieved as follows: With reference to FIG. 6, signal 207 enables AND gate 631. Clock pulse signals 250 switch AND gate 631 output 632 which is applied to NAND gates 633 and 634. NAND gate 633 is enabled or controlled by signal 635. Not that signal 624, so long as it is high, causes 635 to be high through the action of OR gate 636. Clock pulses 632 are therefore routed through NAND gate 633 to inverters 604 and 605 buffer memory 304 and parity counter 115 at 629 so long as signal 624 is high. NAND gate 634 is enabled by signal 637 which is normally high. Parity programmer counter 115 is therefore clocked by clock signals originating at 250 and counter 617 is clocked by the same pulses. On the second incoming data pulse, when parity counter 115 reaches a count of 1, signal 638 switches to the high logic level, causing signal 637 to assume a low level and inhibiting NAND gate 634 so that the second clock pulse 632 is not applied to the counter 617. This pulse is applied to parity counter 115, however, and the inhibit signal 638 is removed by the second clock pulse. Parity counter 115 is, at this point in the sequence, at a count of 2 and counter 617 is at a count of 1. Subsequent clock pulses 632 resulting from incoming data therefore are applied to both the parity counter 115 and counter 617 until the sixth clock pulse is received by parity counter 115. Counter 617 is, at this point in the sequence, a count of 5. Signal 624 therefore assumes the low logic level causing signal 635 to assume the low logic level and inhibiting NAND gate 633 so that the 7th clock pulse is not applied to inverters 604 and 605 and therefore does not reach the buffer memory 111 or the parity counter 115. This action prevents the synchronizing pulse which occurred in this interval from being stored in the buffer memory 111. The 8th clock pulse is applied to counter 617 through NAND gate 634 causing the counter to return to zero count. Signal 635 returns to the high logic level and removes the inhbiit from NAND gate 633 and the sequence continues. Similar action to that just described occurs at counts of 13 and 19 to eliminate synchronizing pulses at these points. When a count of 26 has been reached by parity counter 115, counter 617 has reached a count of 25 and signal 624 once again goes to the low logic level. The next incoming data pulse is, in this instance, not a synchronizing pulse however and signal 639 assumes the high logic level and through OR gate 636 output 635 enables NAND gate 633 and allows the pulse to be counted and entered into memory. The 27th data pulse signals the end of a data word and initiates action to be described later.

Parallel Mode

Data processing action previously described, relative to the parallel mode, concerned itself with the first data bit of the data word and the immediately following intersymbol pulse. The data processing sequence about to be described concerns itself with numeric data which occupies the 3rd, 5th, 7th, 9th and 11th bit positions in the data word. As in the previously described case each of these data bits is followed by an intersymbol pulse, however, circuit action during these data bits and during intersymbol pulses associated with these data pulses is substantially different from that previously described.

As previously described, the parallel format utilizes three groups of tone frequencies heretofore designated as the A, B and C groups and illustrated in FIG. 4A and 4B. In order to insure that more than one tone from each of the groups is not present, or that interfering signals from other sources do not alter the content of the data, interlocking circuits are included as shown in FIG. 2.

To illustrate this circuit action let us assume that the incoming data word contains the A1 tone. Signal 291 therefore assumes the low logic level causing AND gate 292 and 293 outputs 294 and 295 to assume the low logic level. AND gate 296 output 297 assumes the low logic level causing AND gate 298 output 299 to assume the low logic level. Subsequent signals at 350, 351 or 352 could not cause circuit action since AND gates 292, 293 and 298 are inhibited through circuit action in response to the legitimate signal at 291. Since the remaining two inputs to NOR gate 356 are in the high logic condition no further circuit action can occur unless a signal exists in the B and C tone groups, 354, 355, 356, 357, 358 or 359. AND gate 360 output 361 assumes the low logic level when either 354 or 355 assumes the low logic state. To complete our data word, let's assume that the C1 tone 357 is present. Presence of the 357 tone causes signals 362, 363 and 364 to assume the low logic level. In review, we have assumed a data word which consists of the A1, B3, C1 tones or signals 291, 352 and 357. Signals 294 and 295 resulting from 291 partially enables NOR gates 268 and 269. Signal 354 partially enables NOR gate 270, while signal 362 and 363 partially enable NOR gates 271 and 272. Not that these same NOR gates are further enabled by the presence of signal 267 (low) which occurred during receipt of the immediately preceding data pulse in our description.

When signals 299, 361 and 364 assume the low logic level condition in response to the incoming data signals NOR gate 353 output 365 causes one-shot circuit 366 to pulse inverter circuit 367 output 368 to the low logic level thereby allowing NOR gates 268 through 272 to apply the data to buffer memory 111 flip flops 307, 308, 309, 310 and 311. At the present time in our analysis of the parallel mode sequence we have accomplished the following: Receipt of the first data bit; shifted this data bit to flip flop 312 in the data memory 111, FIG. 3; receipt of the next data bit and storage of its five components in flip flops 307 through 311 in FIG. 3.

The next event to occur in the parallel data sequence will be the receipt of an intersymbol pulse as previously described consisting of signals 501, 502 and 503 which generate signal 517. Signal 517 initiates a second type of shifting action. Refer now to FIG. 6.

Signal 622 is in the high logic level condition which causes counter 617 to be programmed for operation in a modulus of 5 due to the action of NOR gate 621. When signal 517 occurs due to the receipt of the intersymbol tones, AND gate 607 output 610 enables NAND gate 611 so that clock pulses 616 are fed through AND gate 615 and NAND gate 611 to inverters 604 and 605. The output of inverter 605 delivers clock pulses to the buffer memory circuit 304 and the parity counter 115 at 629. OR gate 612 output 618 is at the high logic level due to signal 610 therefore NAND gate 619 is enabled and clock pulses from AND gate 615 are routed through NAND gate 619 to counter 617. When 5 clock pulses have occurred, and the data in the buffer memory 111 has therefore been shifted 5 positions, counter 617 is at a count of 5 and NAND gate 623 output 624 assumes the low logic level. Charging current through resistor 625 for capacitor 626 causes OR gate 627 to switch latch 613 thereby inhibiting AND gate 615 and terminating clock pulses to the inputs of NAND gate 611 and 619 and the shifting sequence is terminated. Parity counter 115 is at a count of 12 at this point in the sequence.

Subsequent data pulses followed by intersymbol pulses initiate identical action to that just described until a count of 27 has been reached by parity counter 115. The sequence is stopped at a count of 27 by the following circuit action:

Latch circuit 608 was set by signal 306 when it first occurred and signal 609 has enabled AND circuit 607 since that time. Shifting occurs with each intersymbol pulse 517.

At a count of 26, signal 639 causes OR gate 640 output 641 to reset latch 608 through OR gate 664 output signal 665.

Signal 641 maintains signal 609 high until the next clock pulse 629 to parity counter 115 moves the count to 27 and signal 609 assumes the low logic level.

The next data pulse occurs, entering data into buffer memory 307, 308, 309, 310 and 311. The data pulse is followed by an intersymbol pulse but data shifting is not necessary since it was entered in the correct position.

The 27th bit in parallel mode is always the B2 tone, signal 369. Refer now to FIG. 2.

NOR gate 370 input 371 is at the low logic level, having assumed this condition when signal 280 first occurred. Signal 369 therefore results in NOR gate 370 output 284 assuming the low logic level.

Signal 279 enters the bit in buffer memory flip flop 301 and causes flip flop 372 to switch so that signal 373 assumes the high logic level.

Action identical to that described at a count of 26 occurs at counts of 52 and 78 with the exception that signal 374 is the 53rd bit and signal 280 re-occurs as the 79th bit. The shift sequence pulses applied to counter 115 are 1-6-5555.

The pulses applied to the buffer memory at 304 are 6-5555.

When parity counter 115 reaches the count of 26 signal 639 assumes the high logic level condition causing OR gate 640 output 641 to enable NAND gate 633 by signal 635. The next data pulse is clocked into the buffer memory 111 and counted by counter 115 in the normal manner. Recalling that counter 617 is at a count of 25 when counter 115 is at a count of 26, signal 624 is at a low level and therefore signal 624 does not enable NAND gate 633. Signal 639 replaces signal 624.

The foregoing discussion has illustrated the manner in which incoming data is processed by the data receiver 10. In each case the discussion has resulted in the storage of 27 bits of data in the buffer memory and parity counter 115 has reached a count of 27. The 27 bits of data represent 5 digits of data, or in effect 1 meter reading.

The next step in the sequence is to examine the data stored in the buffer memory, determine that it contains the correct number of bits, is positioned correctly in the buffer memory and then transfer it to the output memory.

Data Transfer

Referring now to FIGS. 3 and 6, the presence of a data 1 bit at 306 (low logic level) and 399 (low logic level) partially enables NOR gate 644. 642 is connected through meter 1 select switch (to be discussed later) to 643. At a count of 27, 643 is therefore at a low logic level and NOR gate 644 output 645 assumes the high logic level condition. OR gate 612 output 618 therefore enables NAND gate 619, and causes latch 613 to switch and enable AND gate 615 so that clock pulses 616 are fed to counter 617 through NAND gate 619. Signal 645 also causes 637 to assume the low logic level condition thereby inhibiting NAND gate 634. Signal 622 is in the high logic level so that NOR gate 621 programs counter 617 to operate in the 5 modulus period. Signal 645 also causes NOR gate 646 output 647 to assume the low logic level enabling NOR gate 649, 650, 651, 652 and 653.

At the first clock pulse 620 NOR gate 649 output 654 assumes the high logic level. Signal 654 is connected to 313 in FIG. 3 which causes signal 314 to assume the low logic level. Data bits stored in flip flops 307, 308, 309, 310 and 311 are thereby routed to 315, 316, 317, 318, and 319, respectively.

At the second clock pulse NOR gate 650 output 655 assumes the high logic level condition and is connected to a circuit identical to that one just described which makes available the content of the second 5 bit group of data. Similar action occurs as counter 617 is clocked until it reaches a count of 5 where signal 624 causes latch 613 to inhibit clock pulses from passing through AND gate 615 and the sequence is completed.

The sequence just described is the normal sequence which occurs when parity counter 115 reaches a count of 27. If, at a count of 27 signals 312 or 306 had not assumed the low logic level condition this would indicate that the data stored in the buffer memory 111 was not in the proper position or did not contain the correct number of pulses. Inverter 656 output 657 would assume the high logic level and cause latch 658 to switch so that signal 659 would assume the low logic level. Data transfer would not occur and when the next buffer memory clock pulse 304 occurred signal 643 would return to the high logic level. Signal 657 would return to the low logic level and NOR gate 660 output 661 would assume the high level, signaling that a parity error had occurred. Results of this parity error signal will be discussed later.

Data appearing at FIG. 3 - 315 through 319 and identical circuit positions for the remaining digits undergoes certain corrections and decoding more fully described in U.S. Pat. No. 3,683,368.

Figure 7A:
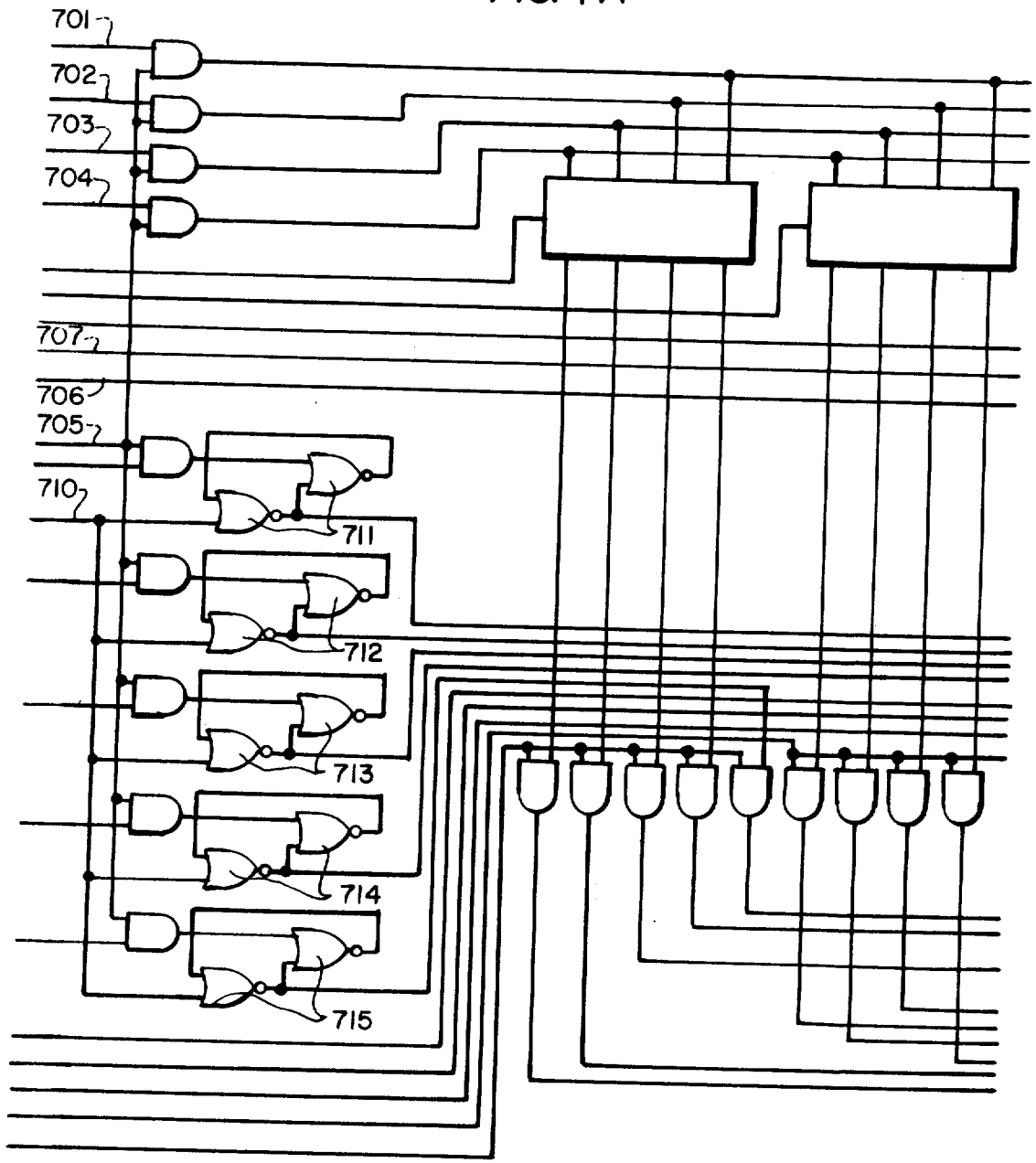
FIG. 7A is an electrical schematic of a portion of the output memory.
Figure 7B:
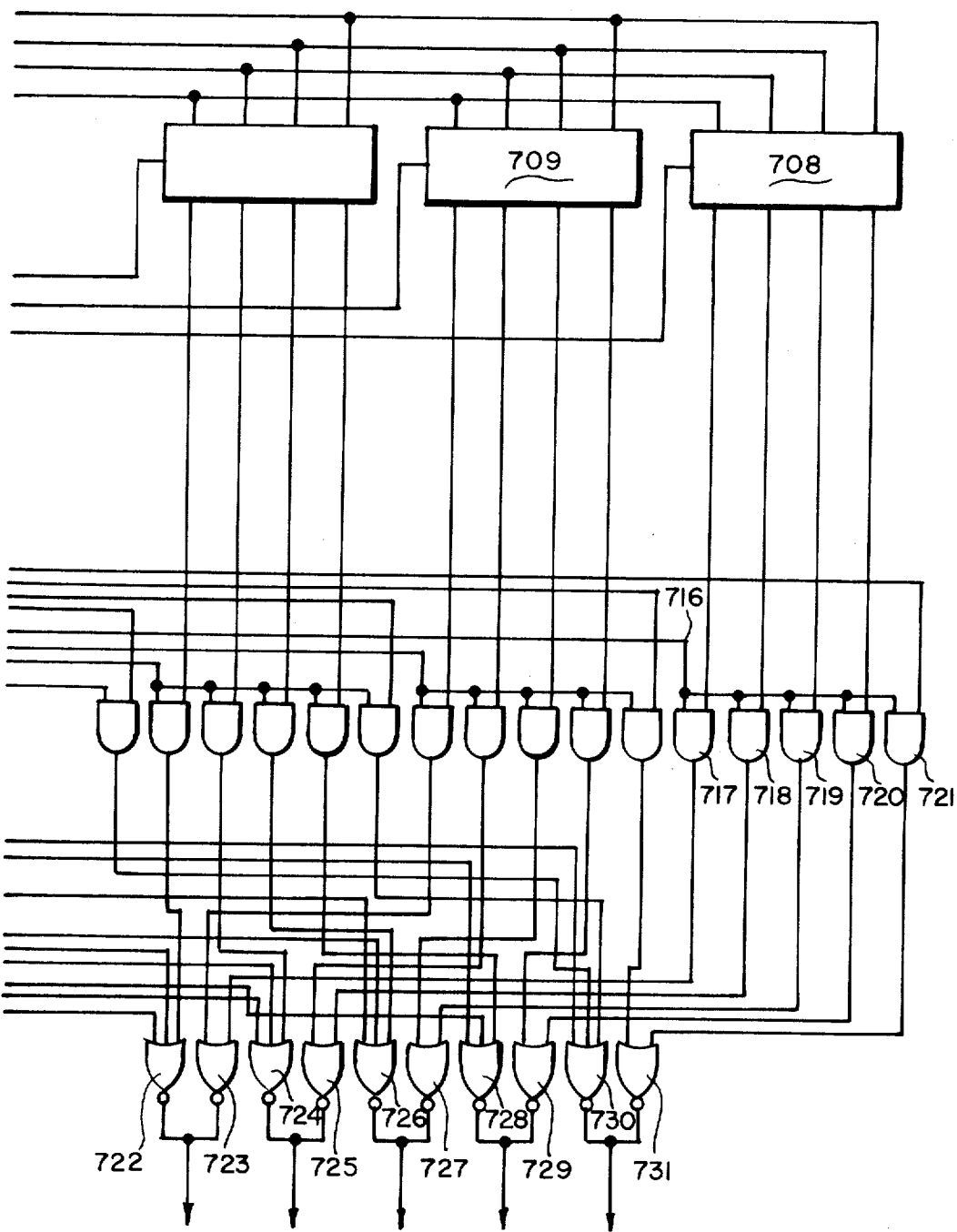
FIG. 7B is a continuation of FIG. 7A.

Part of this process involves the conversion of the data into binary coded decimal form so that the output presented to the output memory circuits shown in FIG. 7 is applied at 701, 702, 703 and 704. Signal 662 is at a high logic level since counter 115 is, at this point in the sequence, at a count of 27. Signal 662 is connected to 705. Signal 654 is connected to 706 and signal 655 is connected to 707.

As data is decoded, signal 654 routes it through corrective and adjusting circuitry where it is decoded and applied to input 701 through 704. Signal 706 enables latch circuit 708 which stores the data. As the decoding sequence proceeds, signal 655 and 707 store the next digit in latch circuit 709, etc. The entire transfer sequence occurs during the interval of the 27th data bit.

In the event that a digit is not present in the buffer memory 111 circuitry as the decoding sequence occurs the fact is recognized by the corrective circuitry outlined in U.S. Pat. No. 3,683,368 and signal 710 is generated and stored in the appropriate latch circuit 711 through 715.

At the end of the data transfer sequences, incoming data continues and is processed in essentially the same manner as that described until a count of 53 is reached. At a count of 53 reception of the second meter reading has been completed and it is transferred in exactly the same manner to the second output memory 122. Data reception again proceeds until a count of 79 has been reached and the third meter reading is transferred to the third output memory 123. Parity checks are performed at each of these points in the sequence so that each of the meter readings has undergone parity checks before it is transferred to the output memory, or in other words, the total data word consisting of three meter readings has undergone three parity checks.

When the count of 79 has been reached by the parity counter programmer 115, signal 663 (FIG. 6) assumes the high logic level. Signal 663 is connected to inverter 801 in FIG. 8. When signal 663 goes to the high level, signal 802 goes to the low level, causing flip flop 803 to switch so that signal 804 goes low and NOR gate 805 is partially enabled. Signal 806 at this point in the sequence is in the low logic level condition. Write clock 125 pulses at 807 are routed through NOR gate 805 to counter 808. As the counter is stepped by the clock 125 pulses, signals 809, 810, 811, 812 and 813 sequentially switch through high logic levels and sequentially enable AND gates in FIG. 7 such as 717, 718, 719, 720 and 721 at a point such as 716. Data stored in the latches such as 708 is routed through AND gates 717 through 721 and NOR gates 722 through 731 to inverters such as 814 through 818 and AND gates such as 819 through 823. The data is routed to BCD to decimal converter 824 and from there to the output recording device 150 where it is recorded digit by digit. Note that on the first clock pulse signal 825 enabled AND gates 819 through 823. On the sixth clock pulse at 807 signal 826 will enable the second set of gates connected in an identical manner to the second meter 122 output memory, etc. until all three meter readings have been recorded by the output device 150. At the end of the write cycle, signal 827 assumes the high logic level condition and signal 806 inhibits NOR gate 805 so that no further clock pulses may pass through. Signal 827 also initiates certain circuit actions associated with the output device.

Figure 10A:
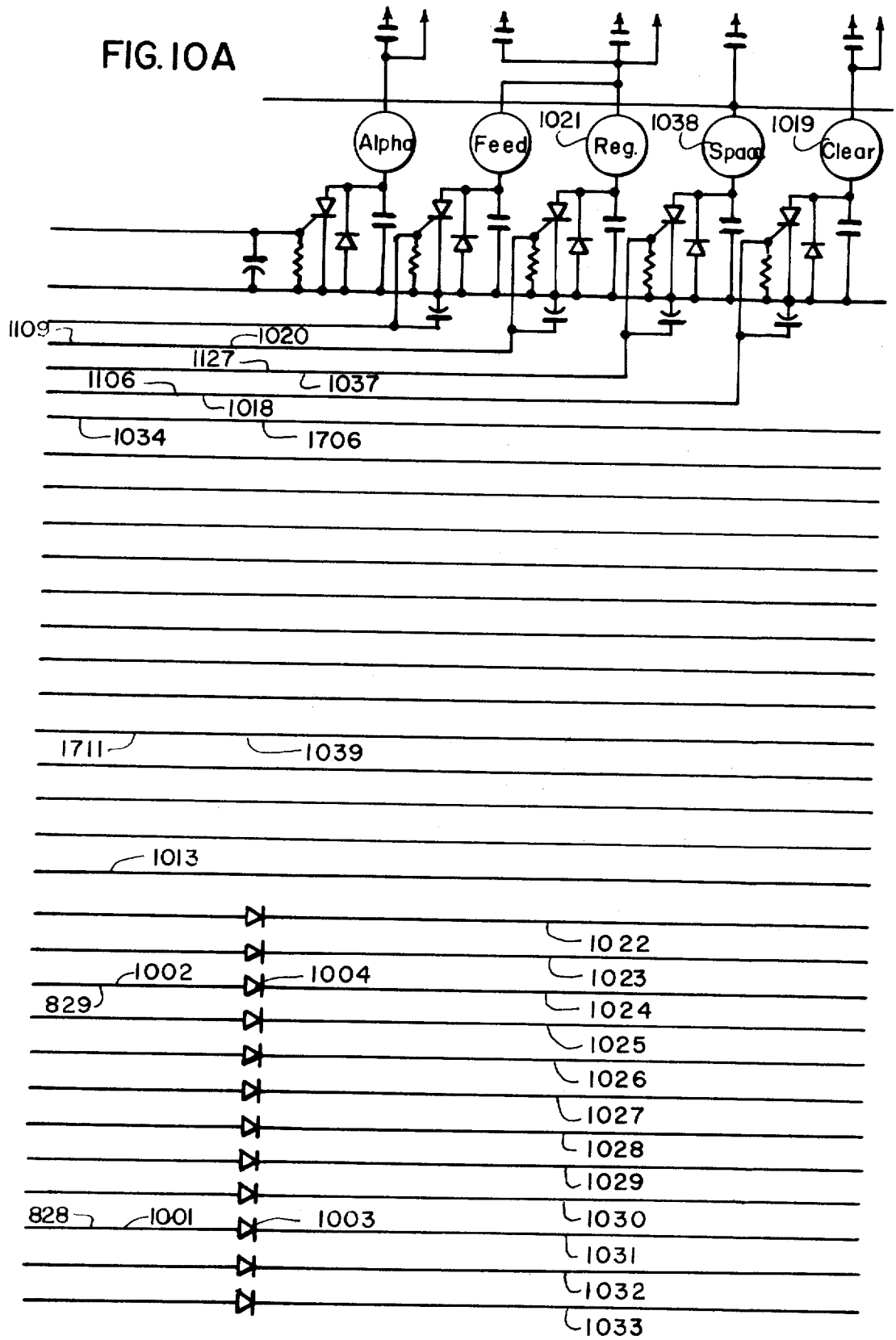
FIG. 10A is an electrical schematic of a portion of the synchronization circuit between the data programmer and the output data receiving device.
Figure 10B:
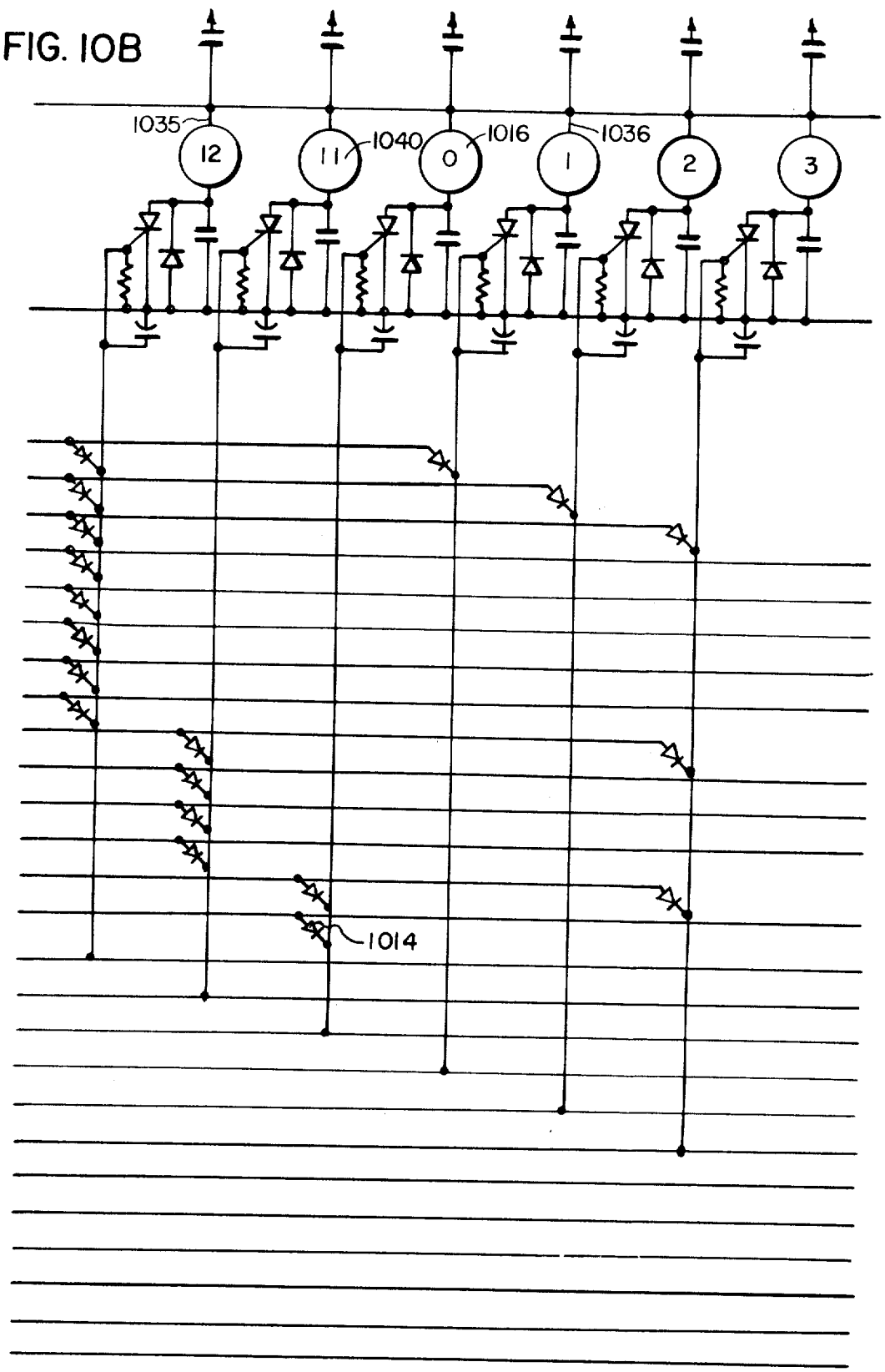
FIG. 10B is a continuation of FIG. 10A.
Figure 10C:
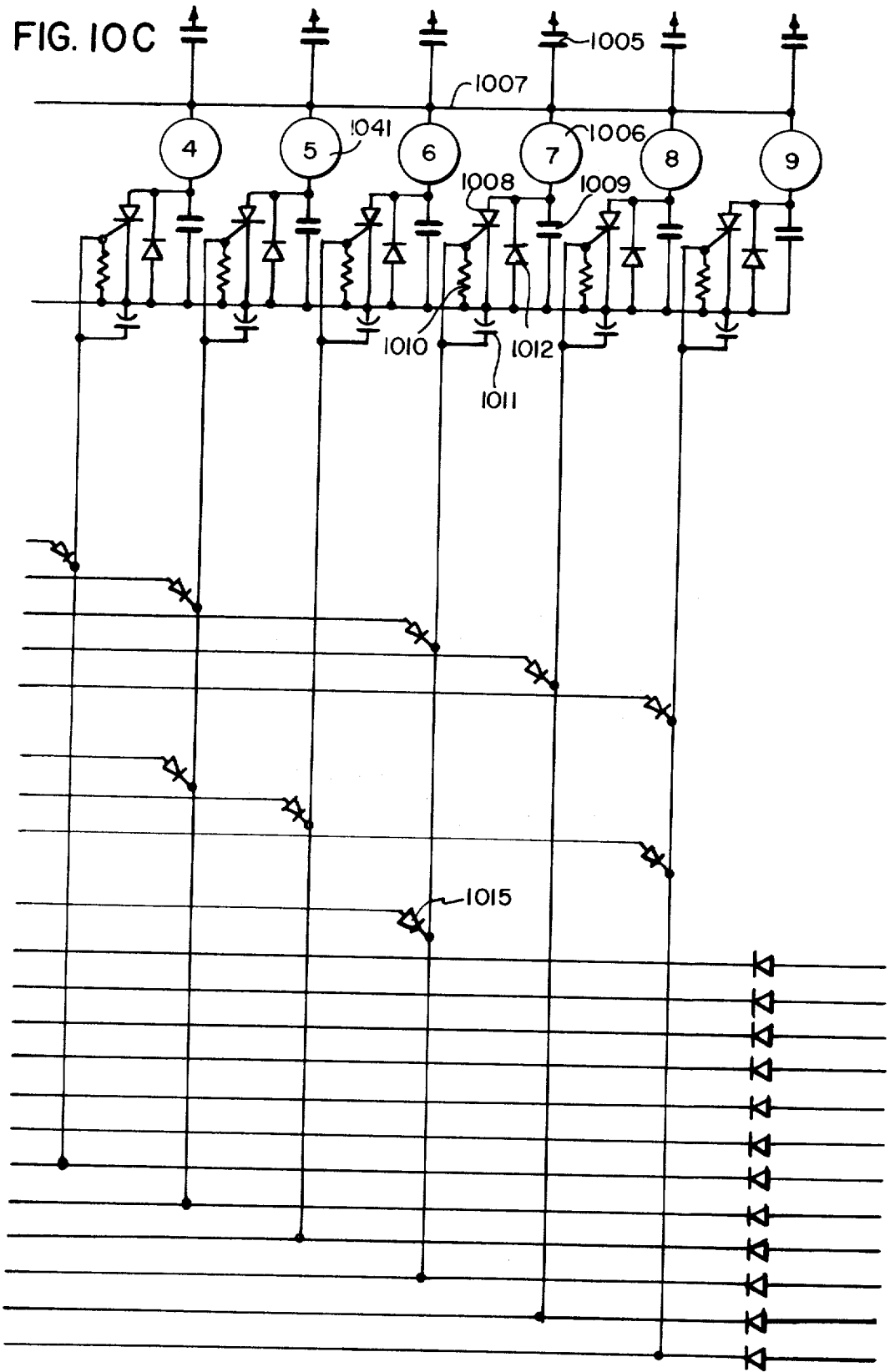
FIG. 10C is a continuation of FIG. 10B.

Output signals from circuit 824 (such as signal 828 or 829) are connected to novel circuitry in the output keypunch machine 150 as shown in FIG. 10. Signal 828 is connected to 1001 and signal 829 is connected to 1002, for example. Isolating diodes such as 1004 and 1003 prevent signals from other sources entering into circuit 824.

With reference to FIG. 10, relay contacts 1005 are connected across keyboard key contacts for the number 7. Closing of these contacts by relay coil 1006 will cause the keypunch machine 150 to punch the number 7 and respond in exactly the same manner as if the 7 keyboard key had been depressed manually. Voltage is supplied to relay coil 1006 from the keypunch machine supply at 1007. Signal 1001 triggers silicon controlled rectifier 1008 into conduction and completes the circuit for relay coil 1006. Signal 1001 is a pulse of a length slightly exceeding the pull in time of relay 1006. SCR 1008 is therefore used to close relay 1006; contacts 1009 hold the relay energized after signal 1001 ends until the keypunch machine 150 has completed its mechanical cycle and supply voltage at 1007 is interrupted. Contacts 1005 are also closed by 1006 and function as previously described to cause the character 7 to be punched into the card.

Note that contacts 1009 also bridge SCR 1008 and therefore allow SCR 1008 to return to the non-conducting state after signal 1001 ends. Resistor 1010 and capacitor 1011 serve to minimize the effects of noise pulses upon the gate circuit of SCR 1008. Diode 1012 protects contact 1009 from the effects of voltage generated by the collapsing field of coil 1006 when supply voltage 1007 is interrupted.

Other numeric characters from zero through 9 are punched in a manner identical to that described for the number 7. Connecting contacts such as 1005 in parallel with keyboard contacts allows the keypunch machine 150 to serve its normal function when it is not in use for automatic meter reading and therefore makes it unnecessary to modify the keypunch machine in any manner other than to make the connections to the necessary contacts.

Alphabetic characters are punched in a manner similar to that just described but involve the use of a numeric character in addition to the 11 or 12 zone in the card in accordance with standard hollerith code format. FIG. 10 shows two different methods by which an alphabetic character can be punched by the novel circuitry shown. As an example, the letter X would be punched by a signal 1013. Signal 1013 would be routed through diode 1014 to relay coil 1016 which would operate contacts 1017 and through diode 1015 to relay 1006 which would operate contacts 1005 as previously described. The letter X, consisting of 0 zone and a 7 zone would be punched since both of the relays would be energized by signal 1013.

Signal 1002, applied to relay 1016 at the same time signal 1001 is applied, would also cause an X to be punched. The latter method is used to record an X to indicate the nil quantity character in a meter reading.

Other signals incidental to the operation of the machine such as card feed, card register, space, card clear are implemented in exactly the same manner as shown in FIG. 10 by the relays so marked. Contacts associated with these relays are also connected in parallel with the applicable keyboard key contacts.

Figure 11:
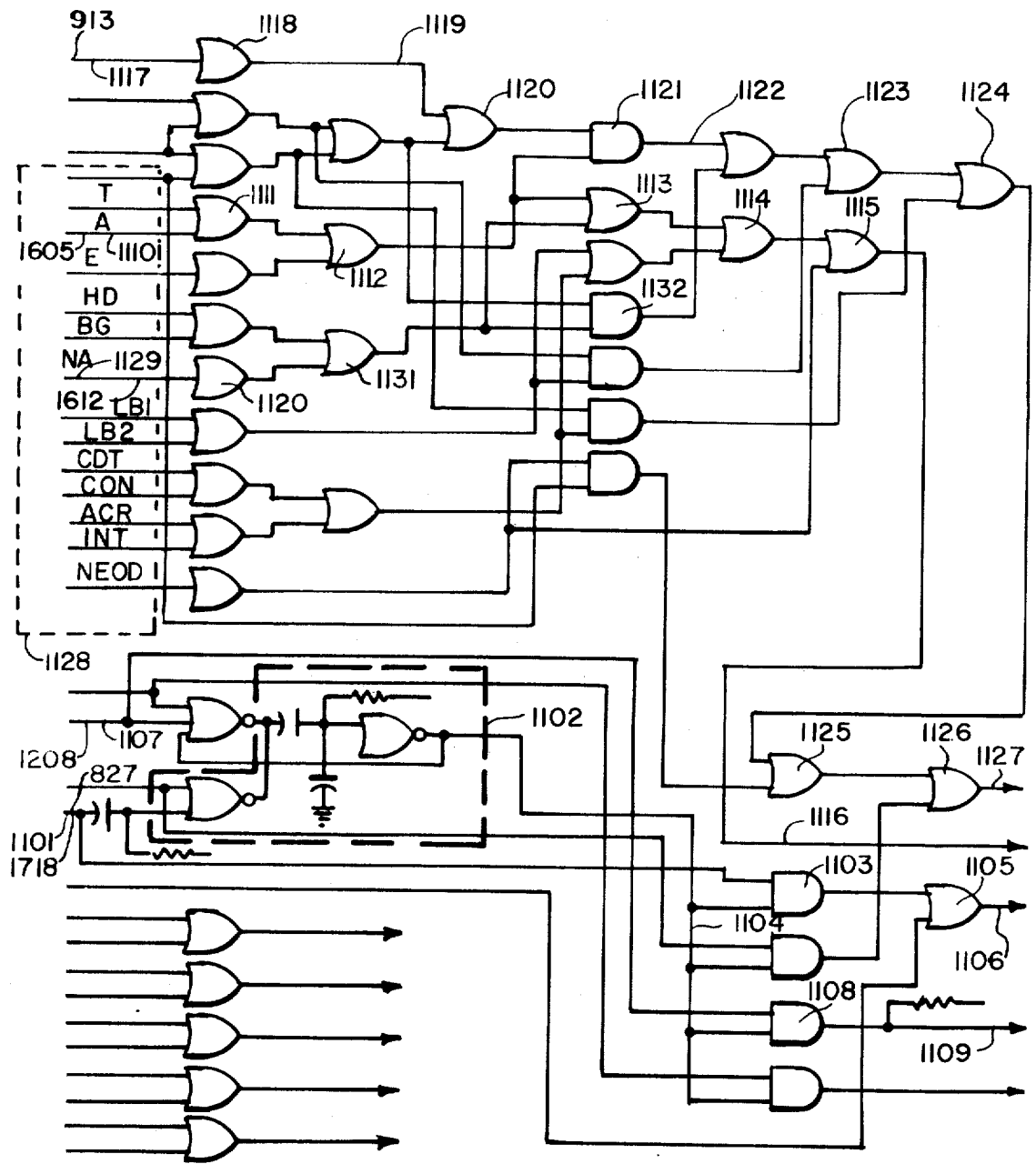
FIG. 11 is an electrical schematic of part of an output driver.

Signal 827 in FIG. 8 is connected to FIG. 11, 1101. When the punching of the meter readings has been completed, signal 827 occurs and enables AND gate 1103. Signal 827 also causes one shot circuit 1102 output signal 1104 to pulse OR circuit 1105. 1105 output 1106 assumes the high logic level.

Signal 1106 is connected to FIG. 10 at 1018 and causes relay 1019 to close and initiate the card release cycle in the output keypunch machine 150. When the card release procedure has been completed, the auto feed circuit in the machine functions in its normal manner to feed another card into position.

Figure 12:
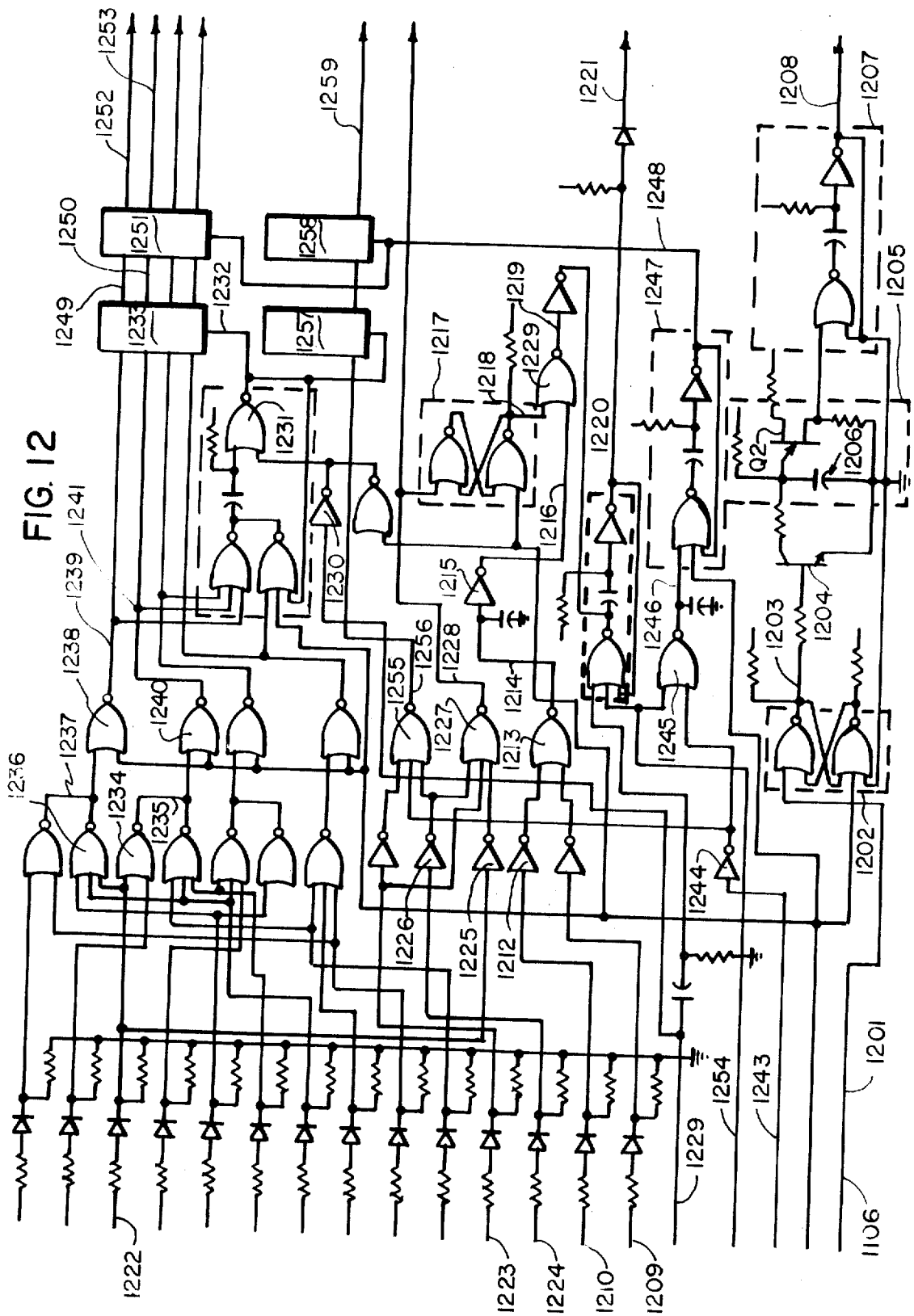
FIG. 12 is an electrical schematic of part of a dialing and polling controller.

Signal 1106 is connected to 1201 in FIG. 12. Latch circuit 1202 output 1203, is at a high logic level causing transistor 1204 to conduct. Signal 1201 causes latch circuit 1202 to assume the set condition. Signal 1203 assumes the low logic level and transistor 1204 ceases to conduct. Unijunction timing circuit 1205 capacitor 1206 begins to charge and when it has accumulated sufficient charge, Q2 conducts causing one shot circuit 1207 output 1208 to be pulsed into the high logic condition.

Signal 1208 is connected to 1107 in FIG. 11. Signal 1107 enables AND gate 1108 and causes one shot circuit 1102 output 1104 to pulse the other input to AND circuit 1108 producing signal 1109. Signal 1109 is connected to 1020 in FIG. 10 and causes relay 1021 to initiate the card register sequence in the output keypunch machine 150.

Figure 13:
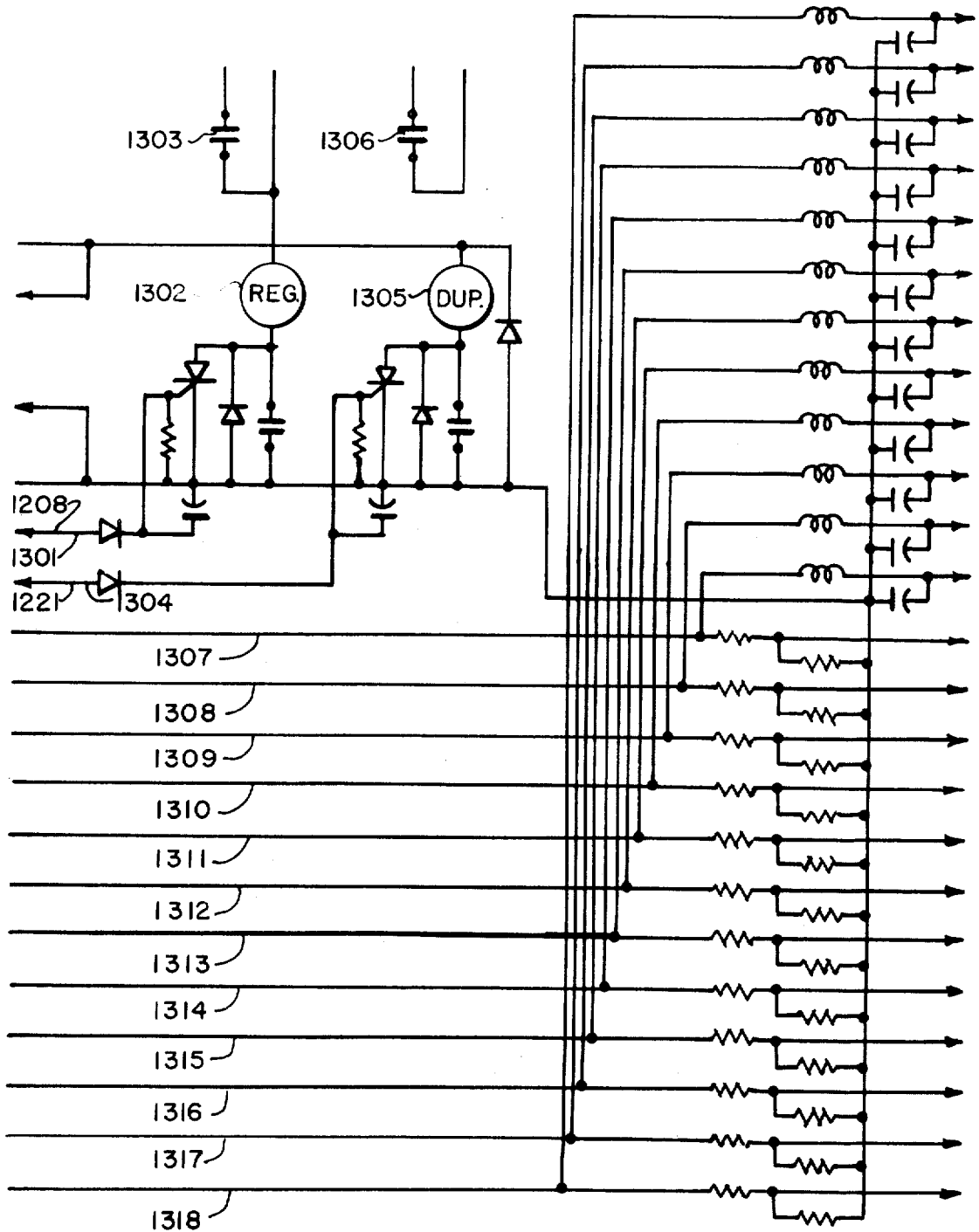
FIG. 13 is an electrical schematic of the synchronizing mechanism connected to the input data programmer.

Signal 1208 is also connected to 1301 in FIG. 13. FIG. 13 illustrates novel circuitry installed in the input keypunch machine 140.

Signal 1208 therefore operates relay 1302 in exactly the same manner as previously described for similar circuitry in the output keypunch machine 150. Contacts 1303 cause the cards in the input keypunch machine 140 to be shifted to the register position as a result of signal 1208.

The action just described marks the end of the meter reading sequence and the point at which the next meter interrogation period begins. As the card registration sequence ends in each of the keypunch machines, mechanical devices in the machines actuate contacts known as keyboard restore bail contacts. The individual signals from each of these contacts are utilized by circuitry shown in FIG. 12 to maintain synchronism between the two independent machines and control the account information duplicating process from the input card to the output card which immediately precedes dialing of the telephone number associated with the duplicated account information.

Signal 1209 assumes the high logic level condition when the input keypunch machine 140 keyboard is enabled at the end of the register cycle. Similarly, signal 1210 assumes the high logic level when the output keypunch machine 150 keyboard is enabled at the end of the card register cycle. Inverters 1211 and 1212 invert these signals so that the two inputs to NOR gate 1213 are both low and its output 1214 assumes the high logic level. Inverter 1215 output 1216 assumes the low logic level condition. Latch circuit 1217 output 1218 is in the low logic level condition so that signal 1219 assumes the high logic level. One shot circuit 1220 output 1221 therefore is pulsed to the high logic level.

Signal 1221 is connected to 1304 in FIG. 13 and causes relay 1305 to close duplicating contacts 1306. This action is equivalent, as far as the input keypunch machine 140 is concerned, to depressing the dupe key stem and therefore the card in the read position on the input keypunch machine 140 is read by the pin sense contacts. With reference to FIG. 13 note that 1307 through 1318 are connected to the pin sense contacts and signals appearing on these lines are connected directly to corresponding relays in the output keypunch machine 150 as shown in FIG. 10 at 1022 through 1033. These signals therefore operate the applicable relay and cause the character read from the input card to be punched into the card in the output machine 150.

The duplicating process, from input card to output card, continues until a character punched into the input card is sensed which represents the end of the information to be duplicated. This character is represented by signals 1222, 1223 and 1224. The character is represented by signal 1222 assuming the high logic level, signal 1224 assuming the high logic level and signal 1223 remaining at the low logic level. Inverters 1225 and 1226 invert signals 1224 and 1222 so that the three inputs to NOR gate 1227 all assume the low logic level and output signal 1228 assumes the high logic level. Signal 1228 causes latch circuit 1217 to switch to the set condition so that its output signal 1218 assumes the high logic level and NOR circuit 1229 output 1219 assumes the low logic level. NOR circuit 1229 can no longer respond to signal 1216 and therefore the duplicating process is terminated.

Figure 14:
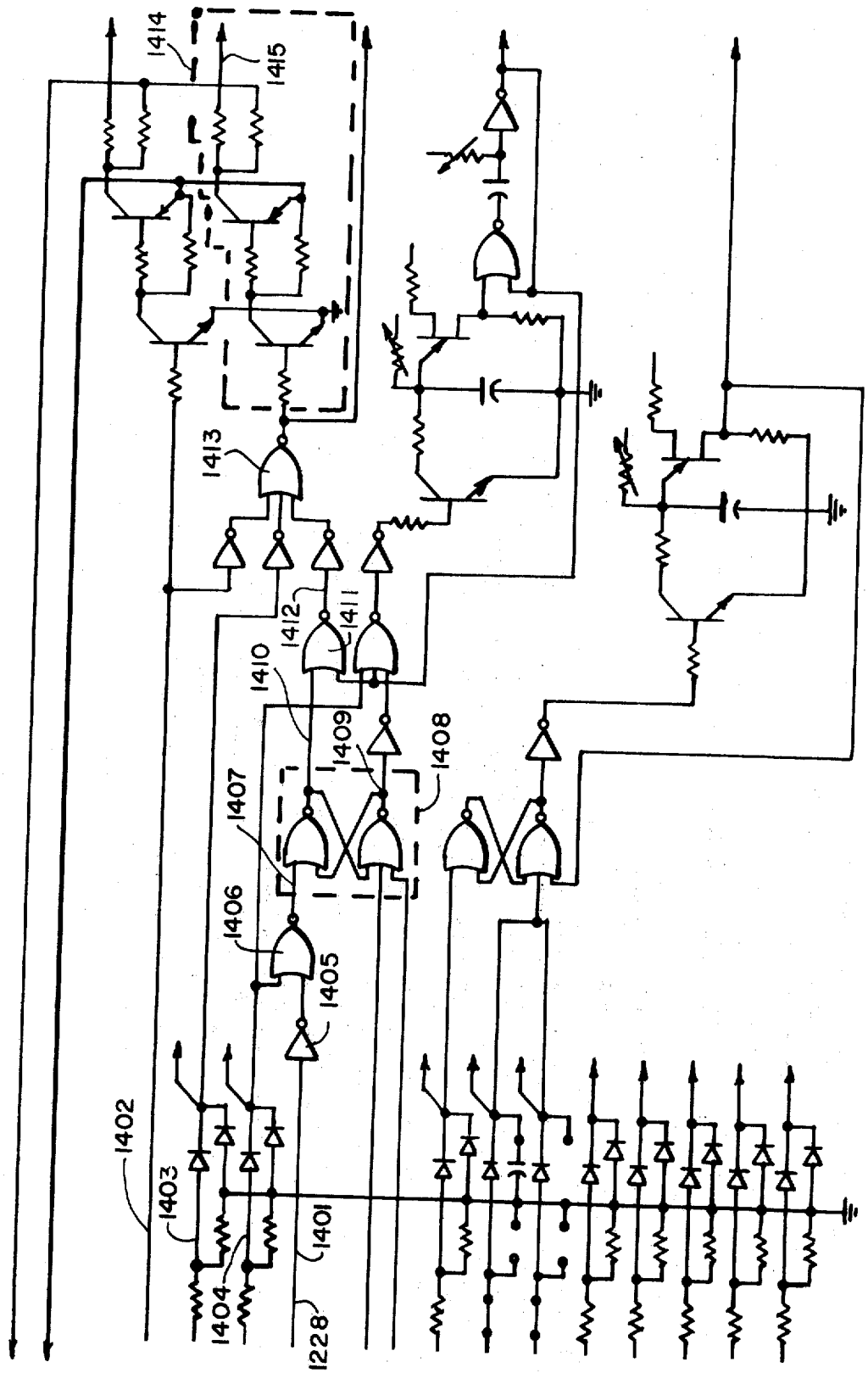
FIG. 14 is an electrical schematic of part of the dialing controller.

Signal 1228 is connected to 1401 in FIG. 14. At this point in the sequence, signal 1402 is in the high logic level condition, signal 1403 is also in the high logic level and signal 1404 is in the low logic level condition. Signal 1401 is inverted by inverter 1405 and therefore NOR gate 1406 inputs are both low and its output 1407 is high. Latch circuit 1408 is therefore in the set condition so that its output 1409 is in the high logic level condition. Signal 1410 is in the low logic level condition and NOR gate 1411 output 1412 is high. All of the inputs to NOR gate 1413 are therefore low and its output is high causing line driver circuit 1414 output 1415 to request from the telephone company central office, through the data communication terminal, permission to begin dialing a telephone number.

When permission to dial is received from the telephone company central office through the DCT unit, signal 1229 (FIG. 12) assumes the high logic level condition and through the action of one-shot circuit 1220, signal 1221 is pulsed to the high logic state and duplicates into the output card the first digit of the telephone number.

Signal 1229 inverted by inverter 1230 enables NOR gate 1231. Output signal 1232 is pulsed to the high logic condition causing 1222 to be stored in memory circuit 1233.

Circuit 1233 is a conventional quad latch circuit consisting of four independent latches which are used to store decimal numbers in binary coded decimal form. For example, signal 1222 results from reading a decimal three from the card in the input keypunch machine and is in a logical high condition. NOR gate 1234 output 1235 assumes the low logic level condition in order to reflect the 2 component of the decimal three and NOR gate 1236 output 1237 assumes the low logic level condition to reflect the 1 component of the decimal three. NOR gate 1238 output 1239 and NOR gate 1240 output 1241 assumes the high logic level condition so that the translated decimal three is applied to the input of storage circuit 1233. One shot circuit 1242 output signal 1232 is pulsed briefly to the high logic level condition and causes storage circuit 1233 to store the binary coded decimal number.

A short time later the telephone company data communication terminal delivers signal 1243 which assumes the high logic level and is inverted by inverter 1244 to the low logic level so that NOR gate 1245 output 1246 assumes the high logic level and causes one-shot circuit 1247 output 1248 to be pulsed to the high logic level. Data present in storage circuit 1233 (and in our assumed circumstance appearing on output leads 1249 and 1250) is therefore transferred to storage circuit 1251 and appears on its output leads 1252 and 1253.

Figure 15:
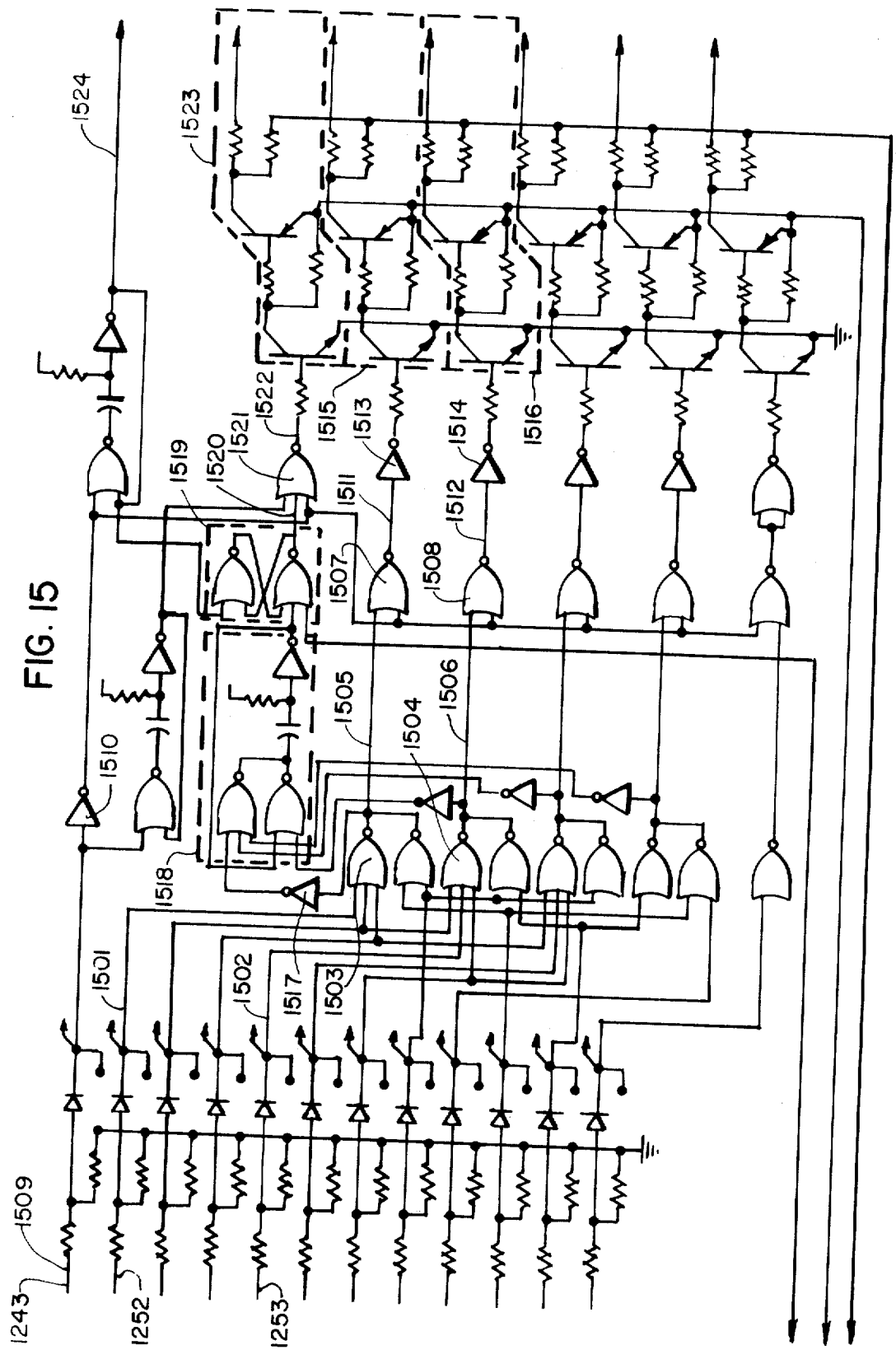
FIG. 15 is an electrical schematic of part of the polling controller.

Output leads 1252 and 1253 are connected to 1501 and 1502, respectively, in FIG. 15. NOR gates 1503 and 1504 outputs 1505 and 1506, respectively, enable NOR gates 1507 and 1508.

Signal 1243 is connected to 1509 in FIG. 15 and, at this point of the sequence, is in the high logic level condition. Inverter 1510 inverts this signal. All inputs to NOR gates 1507 and 1508 are therefore low and their respective outputs 1511 and 1512 cause the outputs of inverters 1513 and 1514 to turn off the input transistors in the line driver circuits 1515 and 1516.

The outputs of line driver circuits 1515 and 1516 are connected directly to the telephone company data communications terminal which transmits the binary coded decimal three to the telephone company central office. Each subsequent digit in the telephone number is transmitted to the telephone company central office in a manner similar to that just described.

Signal 1505 or 1506, as it changed from the high logic level to the low logic level, was inverted by an inverter such as 1517 and caused one shot circuit 1518 to set latch circuit 1519 so that its output 1520 assumes the low logic level condition. NOR circuit 1521 output 1522 therefore assumes the high logic level causing line driver circuit 1523 to transmit, through the telephone company data communication terminal, a signal which advises the central office that there is a digit present as requested by signal 1243.

Signal 1243 also caused one shot circuit 1225 output 1224 to be pulsed to the high logic level. Signal 1524 is connected to 1254 in FIG. 12 and through the action of one shot circuit 1220 produces an output pulse, 1221, which initiates a duplicating cycle between the two keypunch machines 140 and 150. Each time signal 1221 occurs in the dialing sequence the following action occurs: A digit is read from the input card and punched into the output card. The digit is stored in circuit 1233 for later transfer into circuit 1251 by signal 1248 at which time the duplicating cycle is repeated. The effect of this circuit action is to have stored in circuit 1233 the next digit to be dialed while dialing a digit.

It is important to note that the first digit read was read as a result of signal 1229 and all subsequent digits in the telephone number are read as a result of signal 1243.

Dialing of the telephone number continues until a character is read from the card which signifies the end of the dialing. This character is represented by signals 1224 and 1223 and cause NOR gate 1255 output 1256 to assume the high logic level which is applied to the input of storage circuit 1257. A special character is accompanied by a numeric punch also which causes one-shot circuit 1242 output 1232 to be pulsed to the high logic level condition which stores signal 1256 in circuit 1257. The next time signal 1243 occurs signal 1248 causes the special character to be transferred to circuit 1258 and output at 1259. Signal 1259 is connected directly to the data communication terminal which transmits the digit to the telephone central office. This completes the process of dialing the telephone number and the data receiver awaits further instructions from the telephone company central office.

There are two basic responses which might occur at this point in the sequence, each of which causes the data receiver to respond in a different manner. There is the normal sequence where, upon completion of dialing of the telephone number, the central office alerts the meter reading equipment and transmits a signal through the data communication terminal to the data receiver 10 indicating that the meter reading equipment alerting signal has been transmitted. The other response is one of a supervisory nature through line 151 where, due to line conditions, the central office is unable to alert the meter reading equipment and transmits a signal so indicating.

Figure 16:
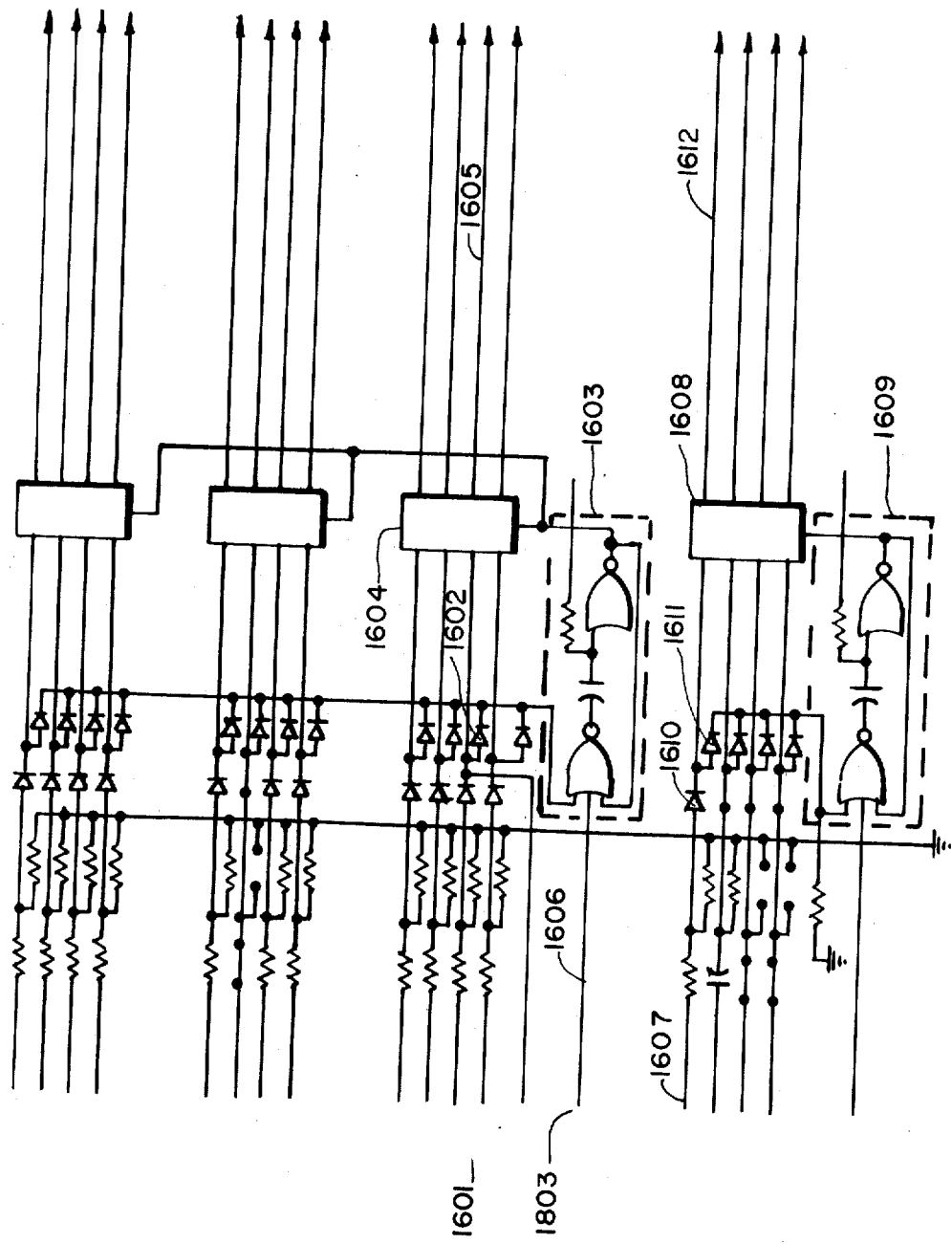
FIG. 16 is an electrical schematic of part of the supervisory interface.

The normal response received from the central office will be the reception of an alerting signal 1601 in FIG. 16 by the data receiver from the data communication terminal. Signal 1601 is represented by high logic level and through diode 1602 causes one-shot circuit 1603 to enable storage circuit 1604 which stores the signal 1601. Storage circuit 1604 output 1605 is connected to 1110 in FIG. 11. Signal 1110 is routed through OR gates 1111, 1112, 1113, 1114, 1115 to 1116. 1116 is connected to 901 in FIG. 9.

Circuit 902 is a conventional unijunction timing circuit whose output consists of positive pulses at a rate compatible with the keypunch machines speed capability. The first positive pulse to occur at the output of circuit 902 after signal 1116 occurs causes the output of AND circuit 902 to assume the high logic level. Inverter 904 clocks flip flop 905 to the set condition. Signal 906 assumes the high logic level and enables AND gate 907. One-shot circuit 908 output 909 is pulsed to the high logic level and is routed through AND circuit 907 and inverter 910 to counter circuit 911 and advances the counter to the count of one. When counter 911 is at the count of one, 912 assumes the high logic level. 912 is connected to 1701 in FIG. 17.

Figure 9:
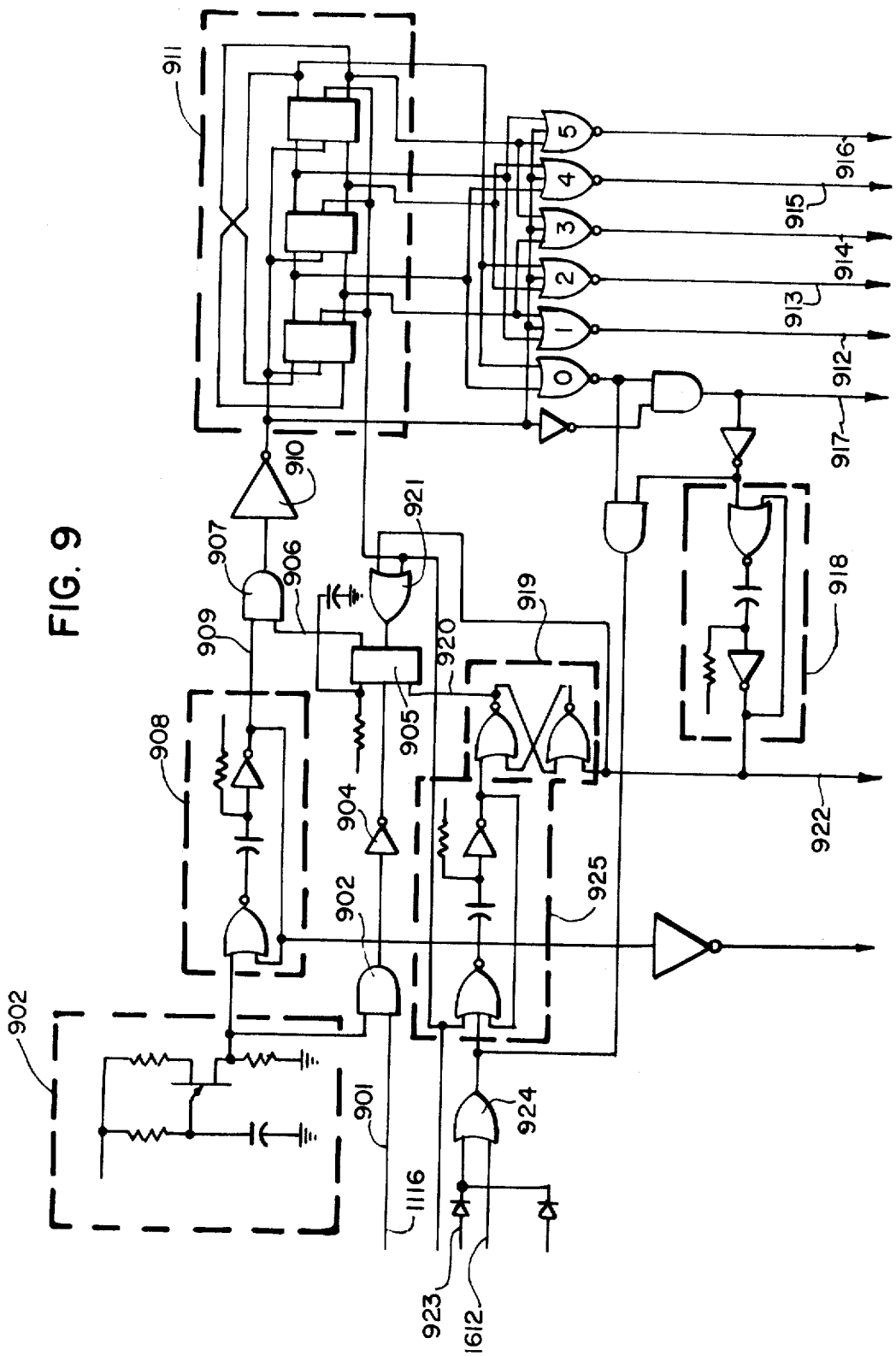
FIG. 9 is an electrical schematic of the supervisory write programmer.
Figure 17:
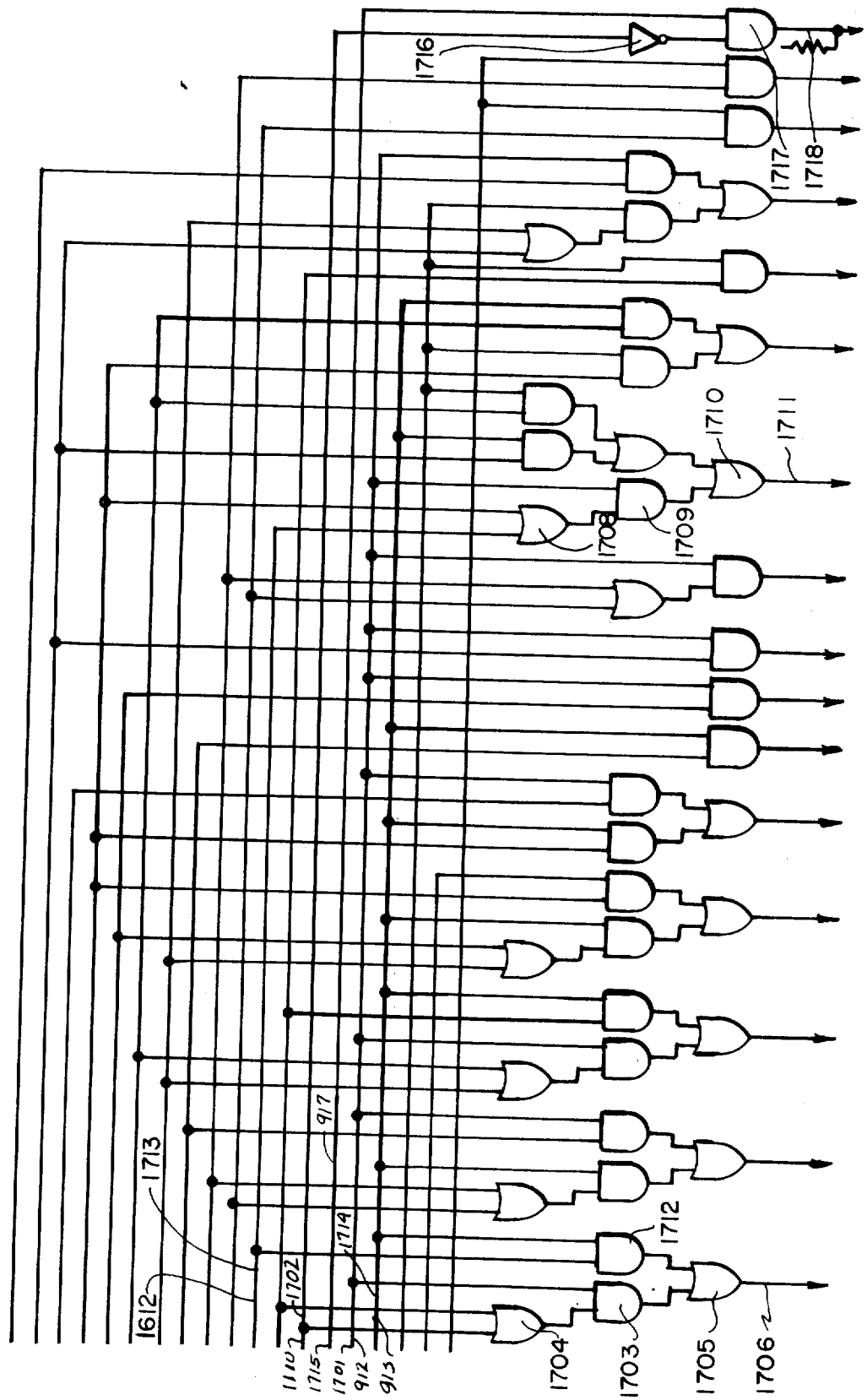
FIG. 17 is an electrical schematic of part of the supervisory output driver.

Signal 1110 is also connected to 1702 in FIG. 17. 1702 is therefore high and is routed to AND circuit 1703 through OR circuit 1704. 1701, since counter 911 in FIG. 9 is at a count of one, is at a high logic level and therefore the output of AND circuit 1703 is routed through OR circuit 1705 to 1706.

1706 is connected to 1034 in FIG. 10 and operates relays 1035 and 1036. Operation of these relays causes the output keypunch machine 150 to punch an A into the output card.

Returning now to FIG. 9, the second clock pulse from clock circuit 902 causes a counter 911 to advance to the count of two so that 913 assumes a high logic level. 913 is connected to 1117 in FIG. 11. 1117 is routed through OR gates 1118, 1119 and 1120 to AND circuit 1121. The second input to AND circuit 1121 is enabled by signal 1110 which is routed through OR gates 1111 and 1112 so that the output 1122 assumes the high logic level and is routed through OR gates 1123, 1124, 1125 and 1126 to 1127.

1127 is connected to 1037 in FIG. 10 and causes relay 1038 to operate and space the card in the output machine 150 one space. As the counter 911 continues to respond to clock pulses from timing circuit 902, signals 914, 915 and 916 occur sequentially and through circuitry similar to that just described cause the card in the output machine 150 to be spaced three more spaces. On the next clock pulse to counter 911 signal 917 assumes the high logic level and causes one-shot circuit 918 to pulse latch circuit 919 so that its output 920 assumes the high logic level. The output of one-shot circuit 918 also is routed through NOR circuit 921 to the clear input of flip flop 905 and causes it to switch to its quiescent condition. With signal 920 in the high logic level condition, flip flop 905 cannot respond to further supervisory signals at 901. Signal 906, with the flip flop in its quiescent condition, is now in the low logic level condition and therefore AND circuit 907 can no longer pass clock pulses to counter 911 and the supervisory write sequence is terminated.

Figure 18:
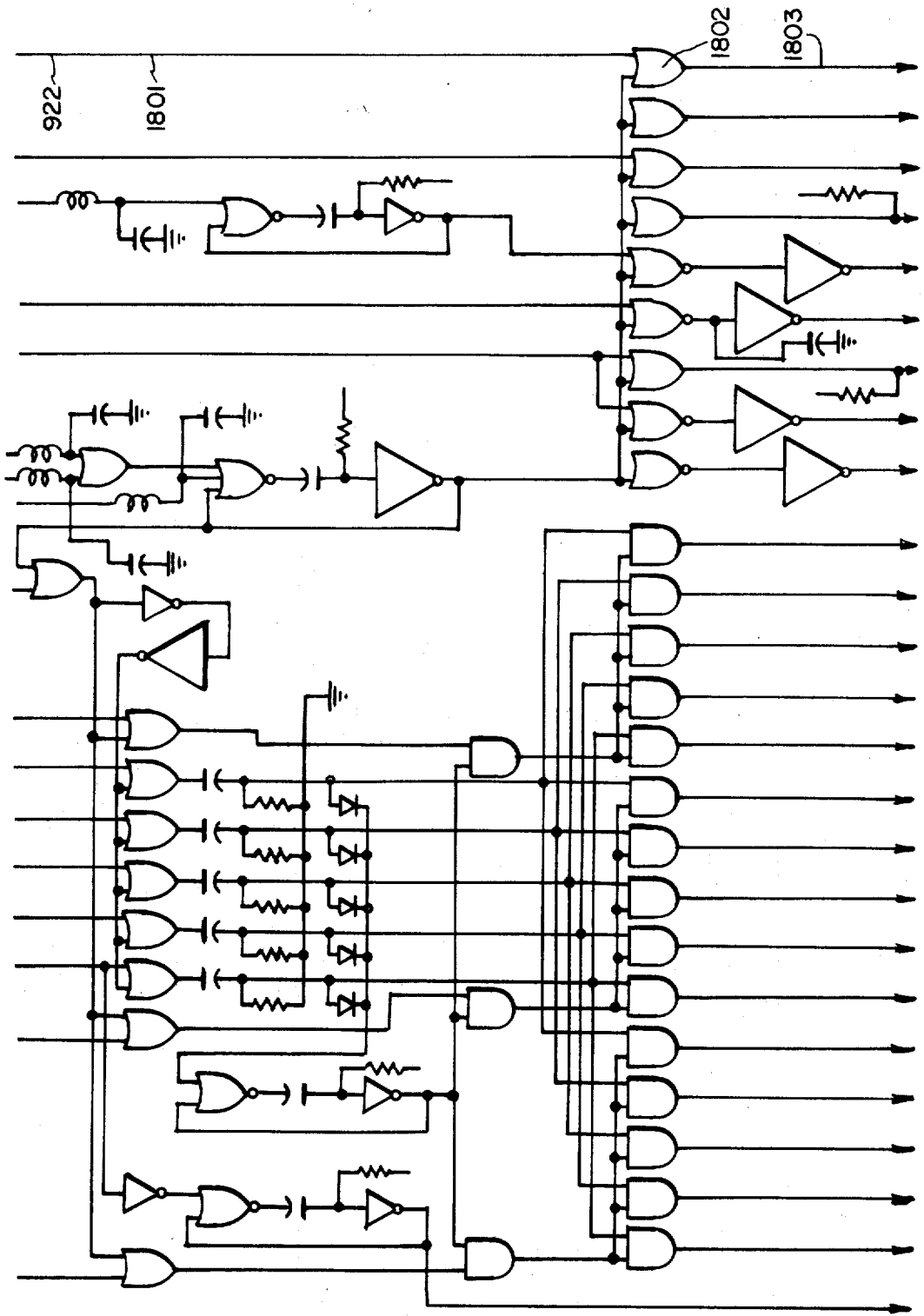
FIG. 18 is an electrical schematic of part of the receiver control.

One-shot circuit 918 output 922 is also connected to 1801 in FIG. 18. Signal 1801 is routed through OR circuit 1802 to 1803 which is connected to 1606 in FIG. 16 and causes one-shot circuit 1603 to pulse its output high and remove supervisory signal 1601 from storage in 1604.

Each of the supervisory signals, which may occur, is arranged to occupy a total of five spaces on the output machine 150 card. Mnemonics for the remaining supervisory signals are shown in FIG. 11 at 1128. The two character mnemonics are punched into the card as follows, for example: BG space, space, space. The three alphabetic character mnemonics are punched, for example: CON space, space, The three character alphanumeric characters are punched for example: LB space, space, 2 and finally the four character mnemonic is punched NEOD space.

At the present time in our description sequence the data receiver 10 has altered the remote meter reading transducers and is awaiting a meter reading or further supervisory information. Since we have already described the circuitry involved in normal meter readings we will assume for the purpose of illustration that we receive a supervisory signal instead of a meter reading.

There are two supervisory signals which can occur following the alerting tone. These are the no access (NA) or parity error (E).

In the event that the meter reading transducers at the residence does not respond to the alerting tone, the telephone company central office transmits, through the data communications terminal, a no access signal. The no access signal is designated 1607 in FIG. 16 and is stored in circuit 1608 by action of one shot circuit 1609 which is pulsed through diodes 1610 and 1611. The stored signal appears at 1612 which is connected to 1129 in FIG. 11. OR circuits 1130 and 1131, 1113, 1114 and 1115 route this signal to 1116 where it initiates the supervisory write cycle as previously described. AND circuit 1132 introduces the signal into the proper format circuitry at OR gate 1122.

1612 is also connected to 1707 in FIG. 17 where it selects the alphabetic characters through OR gate 1708, AND gate 1709, and OR gate 1710. 1711 is connected to 1039 in FIG. 10 where it operates relays 1040 and 1041 to punch an N in the output card.

The letter A which occurs at the count of two of counter 911 in FIG. 9 is enabled through AND gate 1712 and OR gate 1705 by signals 1713 and 1714.

Signal 1612 is also connected to 923 in FIG. 9. The signal is routed through OR gate 924 to one-shot circuit 925. The output of one shot circuit 925 pulses latch circuit 920 and restores the latch to its quiescent condition. Signal 920 therefore assumes the low logic level condition and enables flip flop circuit 905. The effect of signal 1612 at 923 was therefore to remove the inhibit placed on flip flop circuit 905 by the alerting signal 1116 previously described and allow a second supervisory write cycle to be initiated so that the supervisory condition could be recorded in lieu of a meter reading.

The mnemonic (NA) is recorded as described in essentially the same manner. When signal 917 occurs in the sequence, a new circuit action is initiated.

Signal 917 is connected to 1715 in FIG. 17. Signal 1702 is at a logical low level and signal 1716 is therefore at a high logic level. Signal 1715, in combination with signal 1716, causes AND circuit 1717 output 1718 to assume the high logic level. Note that this action could not occur when the alerting supervisory write cycle occurred because signal 1702 was at a high logic level condition and signal 1716 was at a low logic level condition.

Signal 1718 is connected to 1101 in FIG. 11 where it initiates the card release cycle in both machines which begins a new interrogation cycle.

The present invention, therefore, is well adapted to carry out the objects and attain the ends and advantages mentioned as well as those inherent therein. While presently preferred embodiments of the invention have been given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. A data receiver for polling, receiving and processing data from a plurality of measuring transducers through a communication system comprising, an input having means for receiving a plurality of different signaling modes, temporary storage memory means connected to the input for receiving the incoming data, means electrically connected to the temporary storage means for checking the parity of the incoming signal, a comparator and comparatory memory receiving the output from the temporary storage for correcting ambiguities in the position of the measuring transducer, an output memory means receiving the corrected output from the comparator and the comparator memory, a data programmer including identification of said transducers, said programmer connected to the communication system for controlling polling of the transducers, and a data output receiving device connected to the output memory and to the programmer for receiving the output data from the output memory along with corresponding identification from the programmer.

2. The apparatus of claim 1 wherein the temporary storage means is a serially connected plurality of flip flops for receiving data in a serial mode, and having means for parallel entry into the first six bit positions, and a clock circuit connected to the plurality of flip flops for moving data pulses entered into these six positions by parallel means serially into the flip flops on receipt of intersymbol parallel data pulses.

3. The apparatus of claim 1 wherein the data programmer and the data output receiving device are keypunch machines and including, an auxiliary contact connected across each of a plurality of keyboard contacts of the output receiving keypunch machine, each of the auxiliary contacts having an actuating coil, each actuating coil having an actuating line connected from the data programmer keypunch machine in the data receiver, each actuating line including a diode and an SCR for allowing actuation of the actuating coil through the actuating line, and a logic circuit between the two keyboard machines for maintaining the two keyboard machines in synchronism.

4. The apparatus of claim 3 wherein the actuating coil includes a second auxiliary contact in parallel to its connected SCR for turning off its SCR.

5. The apparatus of claim 4 wherein the data programmer input keypunch machine includes, an auxiliary contact connected across each of a plurality of keyboard contacts of the data programmer keypunch machine, each of said auxiliary contacts having an actuating coil, each actuating coil having an actuating line, each actuating line including a diode and an SCR for allowing actuation of the actuating coil through the actuating line.

6. A data receiver for polling, receiving, and processing data from one or more measuring transducers through a communication system comprising, an input having means for receiving data and synchronizing pulses from the measuring transducers, means electrically connected to the input means for separating the synchronizing pulses from the incoming data, temporary storage memory means connected to the input for receiving the incoming data, means connected to the temporary storage means for checking the parity of the incoming signals, a comparator and a comparator memory receiving the output from the temporary storage for correcting ambuigities in the position of the measuring transducers, an ouput memory means receiving the corrected output from the comparator and comparator memory, a data programmer including identification of said transducers, said programmer connected to the communication system for controlling polling of the transducers, and a data output receiving device connected to the output memory and to the programmer for receiving the output data from the output memory along with corresponding identification from the programmer.

7. The apparatus of claim 6 wherein the temporary storage means is a serially connected plurality of flip flops for receiving data in a serial mode, and having means for parallel entry into the first six bit positions, and a clock circuit connected to the plurality of flip flops for moving data pulses entered into these six positions by parallel means serially into the flip flops on receipt of intersymbol parallel data pulses.

8. The apparatus of claim 6 wherein the data programmer and the data output receiving device are keypunch machines and including, an auxiliary contact connected across each of a plurality of keyboard contacts of the output receiving keypunch machine, each of the auxiliary contacts having an actuating coil, each actuating coil having an actuating line connected from the data programmer keypunch machine in the data receiver, each actuating line including a diode and an SCR for allowing actuation of the actuating coil through the actuating line, and a logic circuit between the two keyboard machines for maintaining the two keyboard machines in synchronism.

9. The apparatus of claim 8 wherein the actuating coil includes a second auxiliary contact in parallel to its connected SCR for turning off its SCR.

10. The apparatus of claim 9 wherein the data programmer input keypunch machine includes, an auxiliary contact connected across each of a plurality of keyboard contacts of the data programmer keypunch machine, each of said auxiliary contacts having an actuating coil, each actuating coil having an actuating line, each actuating line including a diode and an SCR for allowing actuation of the actuating coil through the actuating line.

11. A data receiver for polling, receiving and processing data from one or more measuring transducers through a communication system comprising, an input having means for receiving a plurality of different signaling modes each of which includes synchronizing pulses, means electrically connected to the input for identifying which signal mode is being received, means electrically connected to the input for inhibiting the inputs of those signaling modes other than the one being received, means electrically connected to the identifying means for removing the synchronizing pulses from the signal being received, temporary storage memory means connected to the removing means for receiving the incoming data less its synchronizing pulses, means electrically connected to the temporary storage memory means for checking the parity of the incoming received signals, a comparator and a comparator member receiving the output from the temporary storage for correcting ambiguities in the position of the measuring transducers, an output memory means receiving the corrected output from the comparator and the comparator memory, a data programmer including identification of said transducers, said programmer connected to the communication system for controlling polling of the transducers, and a data output receiving device connected to the output memory and to the programmer for receiving the output data from the output memory along with corresponding identification from the programmer.

* * * * *

UNITED STATES PATENT OFFICE
CERTIFICATE OF CORRECTION

Patent No.  3,820,075     Dated  June 25, 1974

Inventor(s)  Theran L. Ebner

It is certified that error appears in the above-identified patent and that said Letters Patent are hereby corrected as shown below:

Column 7, line 43, change the first occurrence of "605" to --604--

Column 8, line 41, change "270" to --279--

Column 12, line 37, change "Not" to --Note--

Signed and sealed this 24th day of December 1974.

(SEAL)
Attest:

McCOY M. GIBSON JR.          C. MARSHALL DANN
Attesting Officer            Commissioner of Patents